United States Patent [19]

Citron et al.

[11] Patent Number: 4,532,592
[45] Date of Patent: Jul. 30, 1985

[54] ENGINE-PERFORMANCE MONITOR AND CONTROL SYSTEM

[75] Inventors: Stephen J. Citron; William P. Mihelc, both of West Lafayette, Ind.

[73] Assignee: Purdue Research Foundation, Lafayette, Ind.

[21] Appl. No.: 452,372

[22] Filed: Dec. 22, 1982

[51] Int. Cl.³ .................. F02P 9/00; G01M 15/00
[52] U.S. Cl. .................. 364/431.05; 123/416; 123/417; 123/339; 364/431.07; 364/551
[58] Field of Search .......... 364/551, 431.09, 431.12, 364/431.05, 431.01, 431.07, 431.08; 123/416, 486, 414, 476, 494, 478, 440, 489, 339, 340; 73/116, 119 A, 119 R

[56] References Cited

U.S. PATENT DOCUMENTS

| | | | |
|---|---|---|---|
| 4,009,699 | 3/1977 | Hetzler et al. | 364/511 |
| 4,055,998 | 11/1977 | Pettingell et al. | 364/550 |
| 4,168,682 | 9/1979 | Gartner et al. | 123/416 |
| 4,267,810 | 5/1981 | Wesemeyer et al. | 123/414 |
| 4,271,469 | 6/1981 | Kawai et al. | 364/431.12 |
| 4,277,830 | 7/1981 | Reid et al. | 364/511 |
| 4,292,670 | 9/1981 | Reid et al. | 364/551 |
| 4,325,128 | 4/1982 | Abnett et al. | 364/511 |
| 4,434,770 | 3/1984 | Nishimura et al. | 123/476 |

Primary Examiner—Errol A. Krass
Assistant Examiner—Thomas G. Black
Attorney, Agent, or Firm—Barnes & Thornburg

[57] ABSTRACT

An engine-performance monitor for determining the relative combustion efficiencies of the cylinders of a multiple cylinder internal combustion engine permits monitoring of engine performance to test engine fuel distribution system and ignition system control strategies. The system can also be incorporated into a feedback system for controlling the performances of the various individual cylinders of a multiple cylinder internal combustion engine.

10 Claims, 26 Drawing Figures

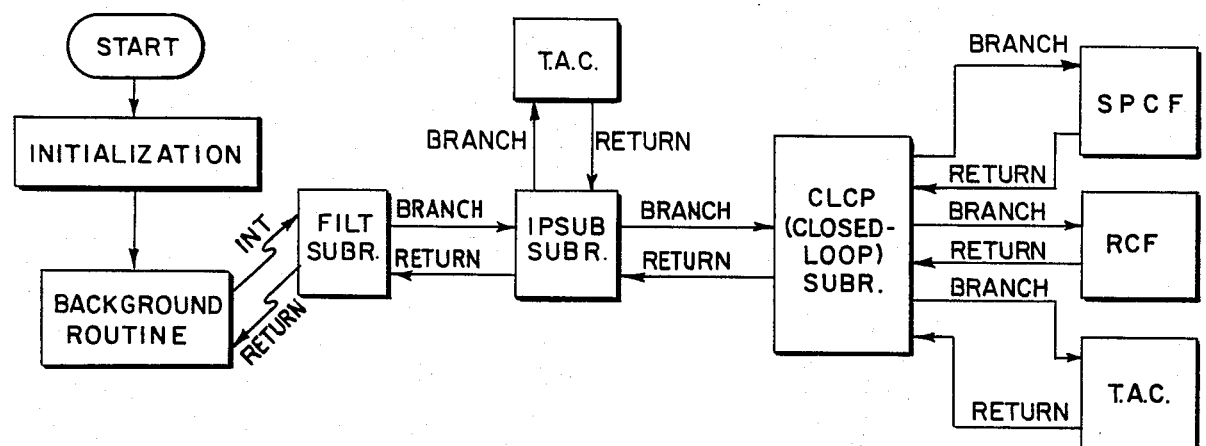
FIG. 13
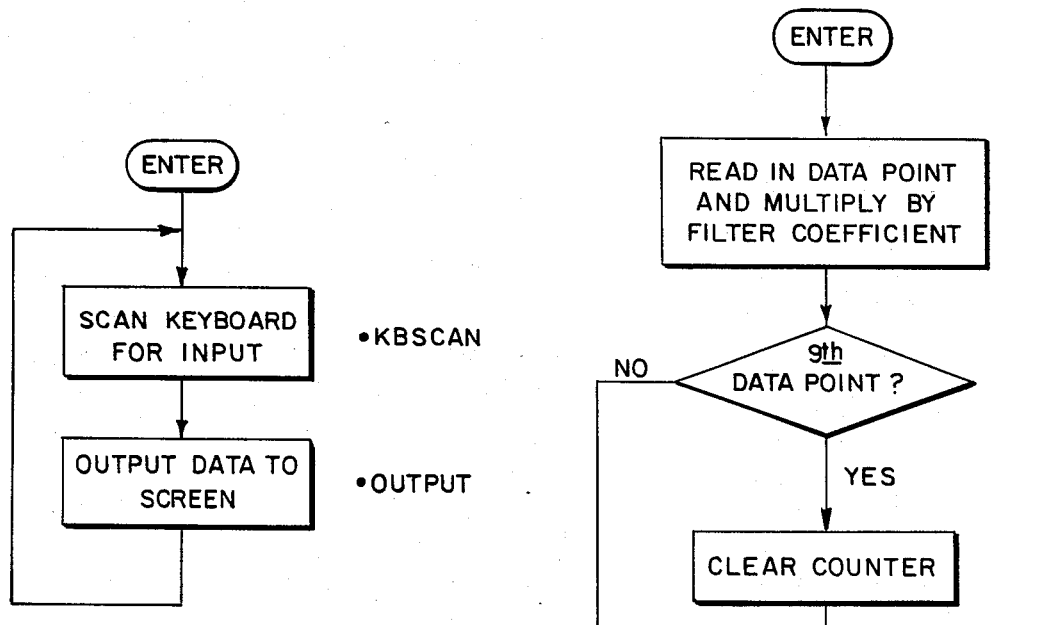
FIG. 14m
FIG. 14b
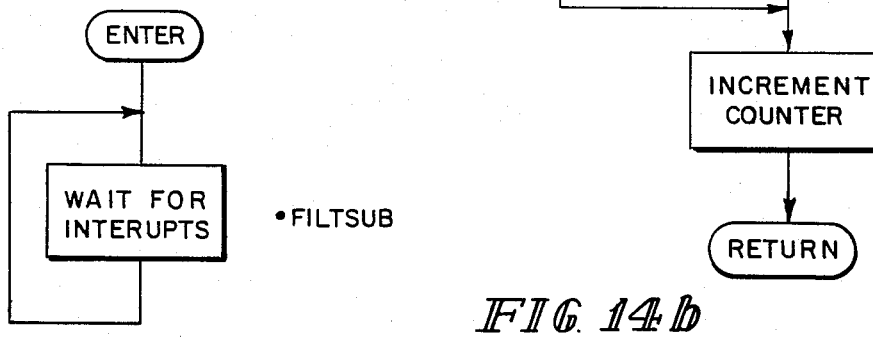
FIG. 14a

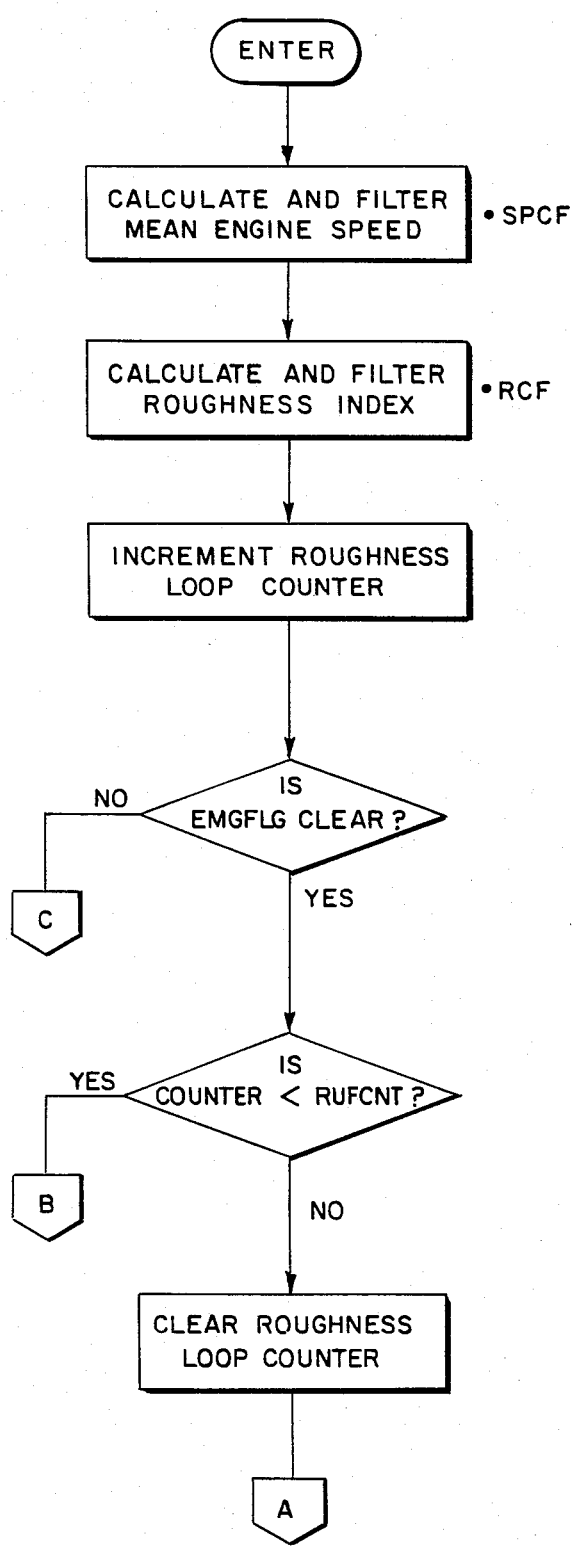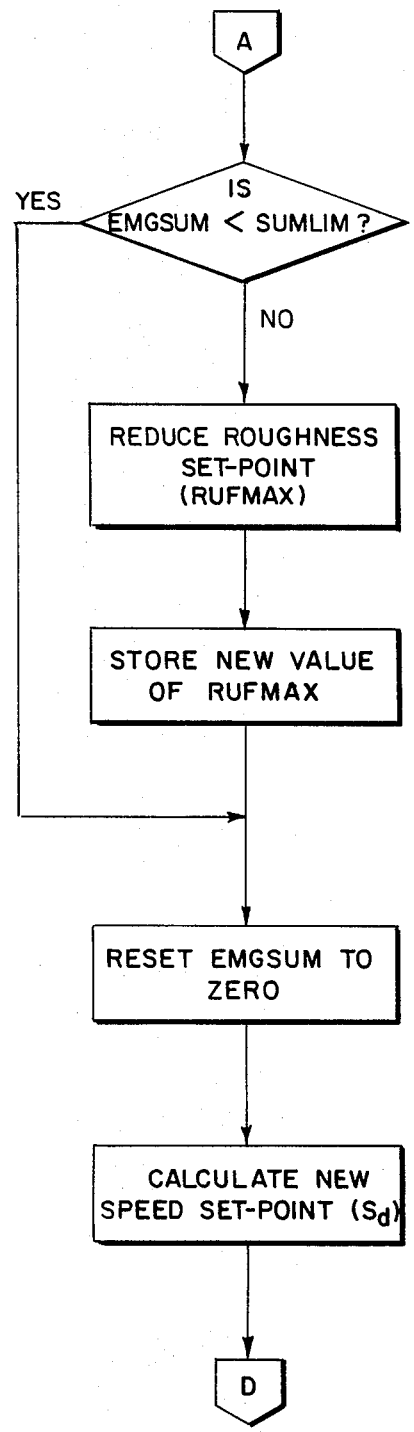
FIG. 14e
FIG. 14f

ENGINE-PERFORMANCE MONITOR AND CONTROL SYSTEM

This invention relates to internal combustion engines, and more specifically to systems and techniques for monitoring the performances of the various cylinders of a multiple cylinder internal combustion engine. This invention also relates to feedback systems utilizing such systems and techniques not only to monitor, but also to control, the performances of the various cylinders of a multiple cylinder internal combustion engine.

Techniques and systems for monitoring the performances, combustion efficiencies, compression balances, and the like of the various cylinders of multiple cylinder internal combustion engines are known. There are, for example, the systems and techniques disclosed in the following U.S. Pat. Nos.: 4,292,670; 4,277,830; 4,197,767; 4,055,998; 4,015,467; and 4,015,466. Different techniques and systems have been used to determine the individual performances of the various cylinders of a multiple cylinder internal combustion engine. These different techniques involve, and demonstrate the viability of, different strategies and philosophies in the operation and control of multiple cylinder internal combustion engines.

It is well known that not all cylinders of a multiple cylinder internal combustion engine produce the same amount of work. That is, on the average, some cylinders produce more work than others. One cause for this variation in work output among the cylinders is the non-uniform distribution of fuel and air among the cylinders. This is particularly true of carbureted engines or engines using a single point fuel injection system where the difficulty of designing an intake manifold capable of distributing air and fuel equally among the cylinders is known. The problem of providing uniform fuel distribution is also present, to a lesser extent, in engines with multiple point fuel injection systems due to the tolerance variations of the injectors associated with the various cylinders. In addition, cylinder-to-cylinder differences in component sizing and operation contribute to the variations in the work output of the individual cylinders.

The relative combustion efficiency measure of a cylinder is a measure of the torque (or work) produced by that cylinder relative to the mean torque (or work) level of all the cylinders of the engine. Knowledge of the amount of cylinder-to-cylinder variation in the combustion efficiency is valuable for both engine diagnostic applications and engine control applications. Consistently low combustion efficiency of a given cylinder, for example, may be an indication of a defective component (a spark plug or a fuel injector, for example). The combustion efficiency outputs of the individual cylinders measured over a period of time may serve as a means for evaluating the effectiveness of the air/fuel delivery system in uniformly distributing the air and fuel among the cylinders. Further, a measure of the relative combustion efficiency of the various cylinders can be beneficial in increasing the overall efficiency of the engine by optimizing control settings such as, for example, ignition or injection timing, on a cylinder-by-cylinder basis.

According to the invention, then, a system for determining the relative combustion efficiencies of the various cylinders of a multiple cylinder internal combustion engine includes means for sensing the position of the engine crankshaft, a clock for generating a time base, an interval timer for comparing the output of the clock to the output of the position-sensing means to generate a crankshaft speed-related signal, and means for coupling the crankshaft position-sensing means and clock to the interval timer. Additional means are provided for sensing the top dead center point of the power stroke in each cylinder. A data processor is provided as are means for coupling the top dead center sensing means and the interval timer to the data processor to provide a plurality of data points about the top dead center. The data processor utilizes the values of those data points to calculate speed of the crankshaft about the top dead center.

Additionally according to the invention, a system for controlling the performances of the individual cylinders of the multiple cylinder internal combustion engine comprises an engine ignition generator and spark distribution system, means for coupling the ignition generator and spark distribution system to the various cylinders of the engine, means for sensing engine crankshaft position, and a clock for generating a time base. Means are provided for sensing the top dead center point of the power stroke in each cylinder, as are means for calculating crankshaft speed and means for coupling the clock and the crankshaft position sensor to the crankshaft speed calculator. Further means are provided for calculating the combustion efficiencies of the various cylinders. The combustion efficiency calculating means are coupled to the clock, the crankshaft position sensor, and the means for sensing the top dead center. Means are provided for calculating the ignition timing of the various cylinders to match, within an acceptable margin of error, the combustion efficiencies of the various cylinders. The combustion efficiency calculator is coupled to the ignition timing calculator and the ignition timing calculator is coupled to the ignition generator and spark distribution system to control it.

According to an illustrative embodiment, the combustion efficiency calculator comprises a data processor for utilizing the signals from the time base generator, the crankshaft position sensor, and the means for sensing the top dead center to provide a set of data points centered about the top dead center.

Further according to the invention, a system for controlling the performances of the individual cylinders of a multiple cylinder internal combustion engine includes an engine fuel distribution system, means for coupling the fuel distribution system to the various cylinders, means for sensing the engine crankshaft position, and a clock for generating a time base. This system further includes means for sensing the top dead center point of the power stroke in each cylinder, means for calculating crankshaft speed, and means for coupling the clock and the crankshaft position sensor to the crankshaft speed calculator. Additional means calculate the combustion efficiencies of the various cylinders. Means are provided for coupling the combustion efficiency calculator to the means for sensing the top dead center, to the means for sensing the crankshaft position, and to the clock. Additional means are provided for calculating a fuel distribution parameter of the various cylinders to match, within an acceptable margin of error, the power outputs of the various cylinders. Means are provided for coupling the combustion efficiency calculator to the means for calculating the fuel distribution parameter, and means are provided for coupling the fuel distribution parameter calculator to the engine fuel distribution system.

According to an illustrative embodiment, the fuel distribution parameter is the amount of fuel which is to be metered into each respective cylinder.

According to another illustrative embodiment, the fuel distribution parameter is the time in the respective cylinder's operating cycle at which the fuel is metered into the cylinder.

The invention may best be understood by referring to the following description and accompanying drawings which illustrate the invention. In the drawings:

FIG. 13 is a program flow chart for a system constructed according to the present invention; and FIGS. 14a-14m are more detailed flow charts of portions of the program flow chart of FIG. 13.

Figure 1:
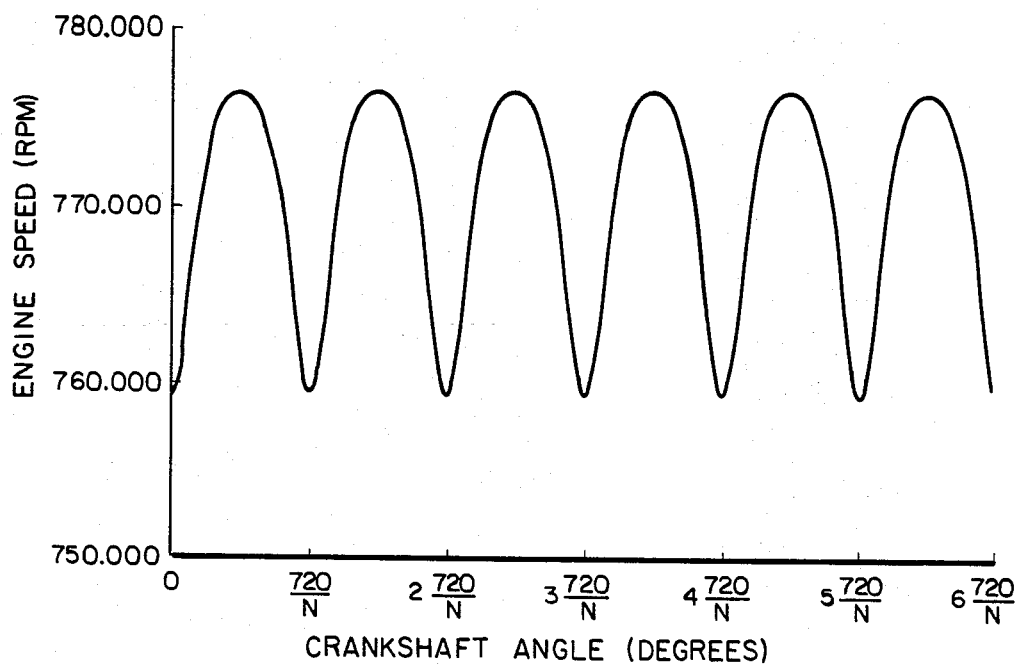
FIG. 1 illustrates a plot of engine speed in revolutions per minute (rpm) versus crankshaft angle (in degrees) for an ideal, or theoretical, engine.
Figure 2:
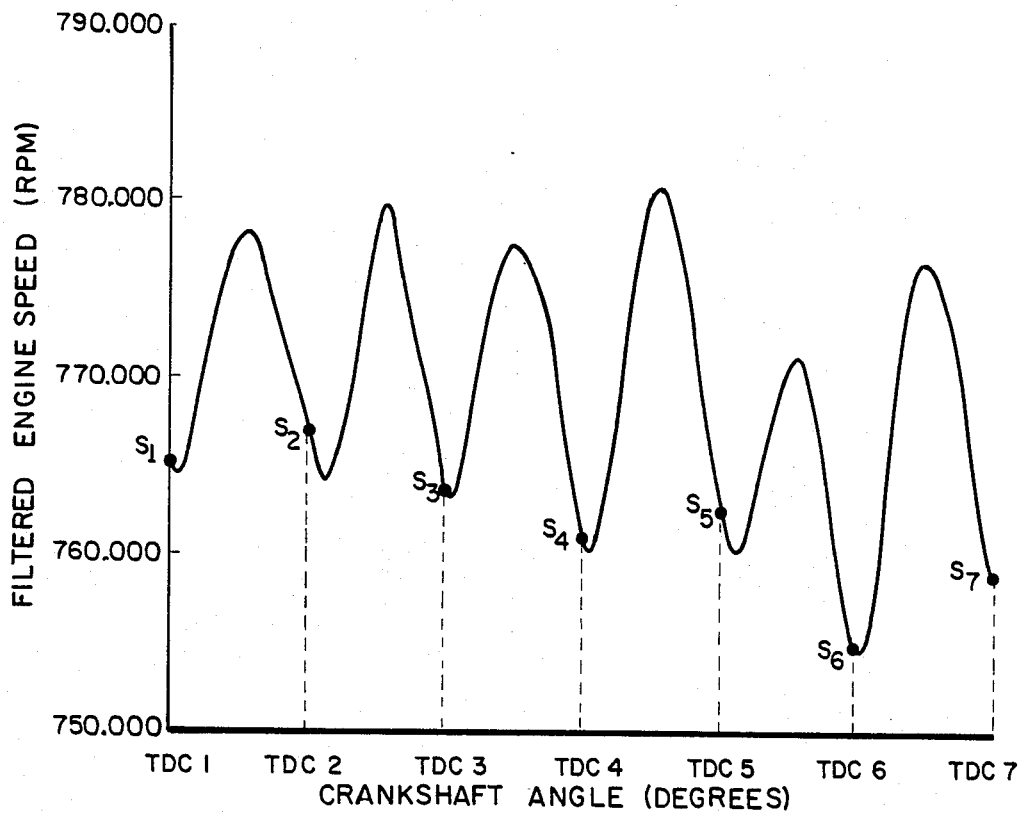
FIG. 2 illustrates a plot of engine speed (rpm) versus crankshaft angle (degrees), filtered, for an actual engine, with the top dead center (TDC) points labelled $S_1 \ldots S_7$.

In an engine operating at steady state, the mean engine speed will remain constant. The instantaneous engine speed will, however, undergo cyclic variations about the mean speed as a result of the energy imparted to the crankshaft during the power stroke of each cylinder. In an ideal engine, all of the cylinders would behave identically and produce the same amount of torque. In this case, the cyclic speed variations would be regular and would repeat every 720/N degrees for a 4-stroke, N cylinder engine as shown in FIG. 1. In an actual engine, the cylinders do not all produce the same amount of torque and the speed variations become irregular. A plot of filtered instantaneous engine speed versus crankshaft angle taken from an engine on a test stand is shown in FIG. 2. The information contained on this speed plot can be used to determine the relative torque levels of the cylinders in the engine.

At any instant in time, the net engine torque will be the sum of the torque contributions of the individual cylinders. It can be shown, however, that over a specific portion of crankshaft rotation, the net torque can be approximated by the torque produced in one cylinder. That is, over this portion of crankshaft rotation, the contributions of the remaining N−1 cylinders may be considered negligible. Application of this concept to engine data indicates that the best control of engine performance can be obtained by using the crankshaft rotation from top dead center (TDC) of one cylinder to TDC of the next cylinder in the firing order. For example, in FIG. 2, the number one cylinder in the firing order reaches TDC prior to beginning the power stroke at the crankshaft angle indicated as "TDC 1". The next cylinder in the firing order reaches TDC 720/N degrees later at TDC 2. Over the period of crankshaft rotation from TDC 1 to TDC 2, the net torque produced by the engine may be approximated as the torque produced by the number 1 cylinder. In other words, for the first 720/N degrees of the power stroke of a particular cylinder, the net engine torque may be approximated by the torque produced by that cylinder.

Figure 3:
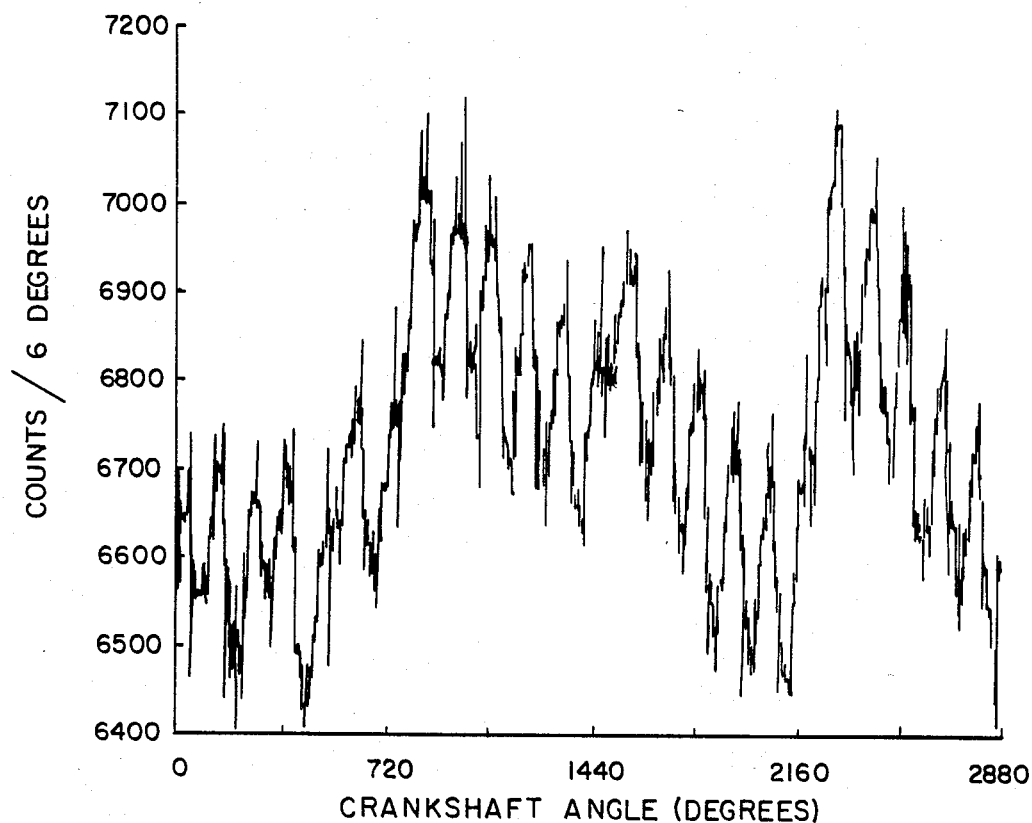
FIG. 3 is a plot of successive measured counts of a 5 MHz clock taken during successive 6° intervals of rotation of a crankshaft of an engine.

Between TDC 1 and TDC 2 the crankshaft speed fluctuation undergoes one cycle. In an ideal engine, the instantaneous speed at the same point in successive cycles would be the same (i.e., $S_1 = S_2 = \ldots = S_N$). The difference in the instantaneous speed at successive TDS's, as illustrated in FIG. 3, is a measure of the engine acceleration over the period. If $\Delta S_j$ is defined as $$\Delta S_j = S_{j+1} - S_j$$

where $S_j$ is the instantaneous crankshaft speed at the jth top dead center, and $\Delta S_j$ is the change in speed between successive top dead centers, then the acceleration $\dot{S}_j$ between top dead center j and j+1 is given as $$\dot{S}_j = \frac{\Delta S_j}{\Delta t} = \frac{S_{j+1} - S_j}{\Delta t}$$

Since engine acceleration is proportional to engine torque, a positive $\Delta S_j$ indicates a positive net torque over the period between TDC j and TDC j+1; a negative $\Delta S_j$ is indicative of a negative net torque. If each $\Delta S_j$ is associated with the torque produced by the cylinder which began its power stroke at TDC j, then the relative torque contribution of each cylinder in the engine can be evaluated.

At steady state the average engine and load torque measured over a suitable number of engine revolutions must be zero. That is, the torque produced by the combustion process in the engine required to maintain the desired speed is balanced by the load torque. In this case, the sum of the $\Delta S_j$ will approach zero. Defining $\overline{\Delta S_k}$ as the mean $\Delta S_j$ for several successive firings of the kth cylinder, it is found that, in general, $$\sum_{k=1}^{k=N} \overline{\Delta S_k} = 0$$

but, that $$\overline{\Delta S_k} \neq 0 \text{ for } k = 1, \ldots, N$$

That is, some cylinders produce more than the average torque and others produce less than the average. Large positive $\overline{\Delta S}_k$ are indicative of greater than average torque production by the associated cylinders, while large negative $\overline{\Delta S}_k$ indicate less than average torque production. This change in instantaneous engine speed between successive cylinders in the firing order reaching top dead center forms the basis for determining the relative combustion efficiency measure.

According to the illustrative embodiments of the invention, the information necessary to calculate the combustion efficiency measure is derived from measuring the time intervals, $T_i$ for successive fixed angular rotations of the crankshaft. The combustion efficiency measure calculated in this manner supplies the same information as the $\overline{\Delta S}_k$ described above. The formulation of the combustion efficiency measure for each cylinder requires four steps: (1) measurement of the crankshaft time intervals $T_i$; (2) on-line digital filtering of these measurements; (3) calculation of an index of performance (IP) for each firing; and (4) averaging the IP for each cylinder over successive firings.

The basis for calculating the combustion efficiency measure is the crankshaft time interval data. A multitooth wheel attached to the engine crankshaft, a stationary magnetic pick-up, and a digital electronic circuit are used to count the cycles of a high frequency clock which occur during a fixed angular rotation of the crankshaft. The measured counts of the clock are directly proportional to the time required for the crankshaft to rotate through the known angle. The relations between the measured counts over the fixed angle of rotation, the time interval of the rotation, and engine speed are given as:

$$C_i = f_{CLK} T_i \text{ (counts)}$$

$$\overline{S}_i = \frac{\Delta \theta}{6 T_i} \text{ (RPM)}$$

where $C_i$ is the measured counts of the high frequency clock (counts), $f_{CLK}$ the clock frequency (Hz), $T_i$ the time interval for the crankshaft to rotate through $\Delta \theta$ degrees (seconds), $\overline{S}_i$ the mean engine speed over the corresponding angle of rotation (RPM, and $\Delta \theta$ the angle through which the crankshaft rotates (degrees). The subscript i refers to the ith data point.

If the time interval, $T_i$, is eliminated from these equations, it is seen that the number $C_i$, counts measured over a given angle of rotation, is inversely proportional to the mean engine speed over this interval. That is, $$C_i = \frac{f_{CLK} \Delta \theta}{6} \cdot \frac{1}{\overline{S}_i}$$

Thus, if the counts for successive know angular rotations are measured, and the last equation is solved for $\overline{S}_i$ in terms of $C_i$, the curve of approximate instantaneous engine speed versus crankshaft angle can be reconstructed. For small values of $\Delta \theta$ this curve approaches the curve of instantaneous speed versus crankshaft angle shown in FIG. 2.

Figure 4:
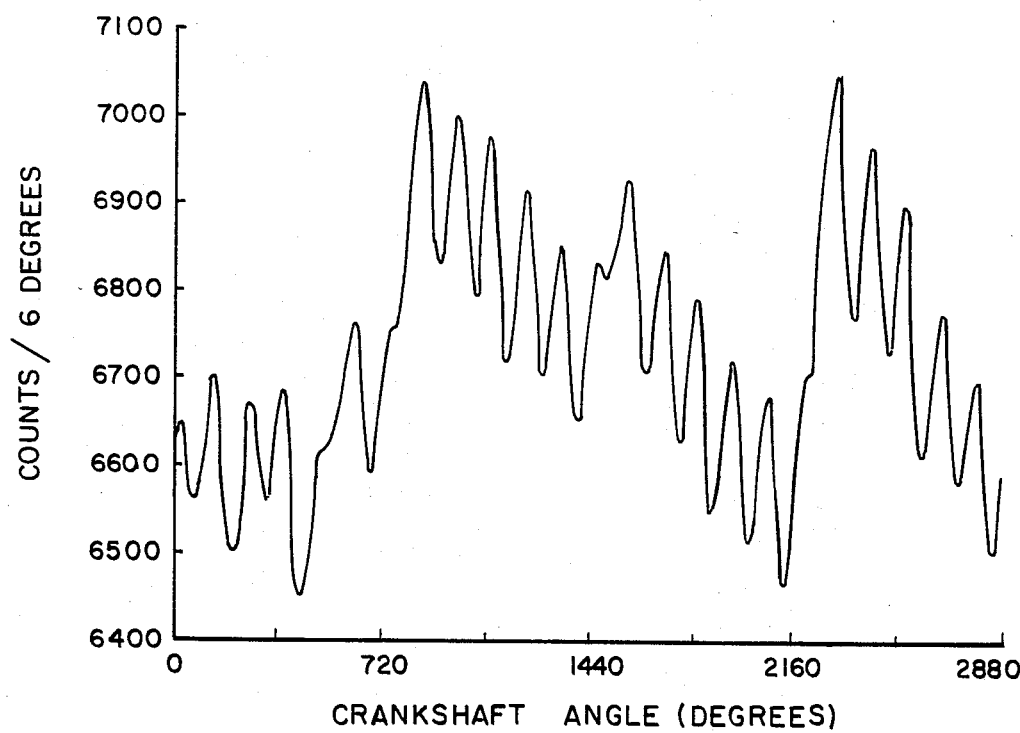
FIG. 4 is a plot similar to FIG. 3, but with on-line, non-recursive digital filtering to remove the noise.

A plot of successive measured counts taken from an engine mounted on a test stand is shown in FIG. 3. For this case $\Delta \theta$ is 6 degrees and $f_{CLK}$ is 5 MHz. The high frequency noise superimposed on the signal is a result of measurement errors, most notably variations in successive $\Delta \theta$. These variations are a result of the inaccuracies of the tooth spacing on the multitooth wheel. Such errors can be reduced by using a higher precision wheel. Another means of reducing the noise is by filtering the data. The system described makes use of an on-line, non-recursive digital filtering technique to reduce the noise. FIG. 4 is a plot of the same data as shown in FIG. 3 after such filtering. The filter has successfully removed the noise, while the normal engine speed fluctuations have not been diminished.

The method for determining the relative torque contributions of each cylinder according to the invention required the instantaneous speed only at crankshaft angles corresponding approximately to top dead centers of the various cylinders. Thus, the complete speed versus crankshaft angle curve need not be considered. Likewise, for the calculation of combustion efficiency based upon crankshaft data, the complete curve is not needed.

Define $C_i$ as the ith unfiltered data point and $\hat{C}_i$ as the ith filtered data point. The non-recursive filtering scheme used in the control system makes use of nine unfiltered data points to calculate each filtered data point. The four unfiltered data points on either side of the point of interest plus the unfiltered data point itself are used. That is $$\hat{C}_i = f(C_{i-4}, C_{i-3}, C_{i-2}, C_{i-1}, C_i, C_{i+1}, C_{i+2}, C_{i+3}, C_{i+4})$$

now, if $Q_j$ is defined as the unfiltered data point coinciding with the jth top dead center and assuming that the first top dead center (j=1) corresponds to the mth data point, then $$Q_j = C_n;\ n = \left(2\frac{n_t}{N}\right)(j-1) + m$$

where $n_t$ is the number of teeth on the multitooth wheel and N the number of cylinders in the engine. Defining $\hat{Q}_j$ as the filtered data point corresponding to $Q_j$, $$\hat{Q}_j = f(C_{n-4}, C_{n-3}, C_{n-2}, C_{n-1}, C_n, C_{n+1}, C_{n+2}, C_{n+3}, C_{n+4})$$

Thus, the $Q_j$ are inversely related to the $S_j$ illustrated in FIG. 4.

The index of performance for each cylinder is calculated based on the filtered data points at successive top dead centers. Thus, $$IP_j = \hat{Q}_j - \hat{Q}_{j+1}$$

A negative $IP_j$ corresponds to an increase in counts from TDC j to TDC j+1. This indicates that the engine speed has decreased in the period between successive TDC's, and that the net torque is negative. A positive $IP_j$ is indicative of an increase in engine speed and a positive net torque. The magnitude of the $IP_j$ is a measure of the change in speed over a fixed crankshaft rotation, which is proportional to the acceleration and thus to the net torque. To establish this relationship, it is noted that $$\overline{S}_j = \frac{\Delta \theta}{6 T_j}$$

where $S_j$ is the mean engine speed over the $\Delta\theta$ degrees of crankshaft rotation about top dead center. For small $\Delta\theta$ $$S_j \approx \bar{S}_j$$

where $S_j$ is the instantaneous engine speed at the jth top dead center. Thus, $$\dot{S}_j = \frac{S_{j+1} - S_j}{t_{j+1} - t_j} \approx \frac{\bar{S}_{j+1} - \bar{S}_j}{t_{j+1} - t_j}$$

where $\dot{S}_j$ is the net engine acceleration between successive top dead centers, and $t_j$ and $t_{j+1}$ are the times at which the jth and j+1st top dead centers are reached respectively. Defining $\Delta t_j$ as the elapsed time between TDC j and TDC j+1

$$\Delta t_j = t_{j+1} - t_j$$

yields $$\dot{S}_j \approx \frac{\bar{S}_{j+1} - \bar{S}_j}{\Delta t_j}$$

However:

$$\hat{Q}_j = \frac{K_1}{\bar{S}_j}$$

where $K_1$ is a function of the clock frequency and the tooth spacing. Solving this equation for $\bar{S}_j$ in terms of $\hat{Q}_j$ and substituting into the preceding one yields $$\dot{S}_j \approx \frac{K_1 IP_j}{\hat{Q}_j \hat{Q}_{j+1} \Delta t_j}$$

It can be shown that $$\frac{\int_{t_j}^{t_{j+1}} T_q(t) dt}{\Delta t_j} \propto \frac{S_{j+1} - S_j}{\Delta t_j} \approx \dot{S}_j$$

where $T_q$ is the net torque. These last two equations thus provide the desired relationship between $IP_j$ and the net torque over the interval.

The $IP_j$ are a measure of the torque produced during the firing of each cylinder. A negative $IP_j$ is indicative of a "poor" combustion event (less than average torque-producing event) while a positive $IP_j$ is indicative of a "good" combustion event (greater than average torque-producing event).

The torque produced by a given cylinder will vary from cycle to cycle due to the variation in the combustion events in the cylinder. To get an accurate measure of the relative torque produced by a given cylinder, the $IP_j$ must be averaged for several successive firings. The combustion efficiency measure for a cylinder is defined as $$IP_k = \frac{\sum_{i=1}^{M} IP_{ik}}{M} \quad k = 1, \ldots, N$$

where $IP_k$ is the combustion efficiency measure for the kth cylinder in the firing order, $IP_{ik}$ is the IP for the kth cylinder on the ith firing, and M is the number of successive firings over which the IP's are to be averaged.

The individual cylinder indices of performance, IP, also form the basis for on-line roughness measurement. Engine roughness is a result of uneven torque production among the cylinders and variations in the torque produced in the same cylinder from cycle to cycle. The index of performance contains information concerning the relative torque production during each cylinder firing. The roughness index, $\hat{R}_i$, is defined as $$\hat{R}_i = \sum_{k=1}^{N} |IP_{ik}|$$

where $|IP_{ik}|$ is the absolute value of the IP for the kth cylinder during the ith engine cycle.

At steady state, the algerbraic sum of the individual performance indices (IP) over an integral number of engine cycles will tend to zero. However, the IP for the individual cylinders will have some non-zero values. The magnitude of the IP is a measure of the variation of the individual cylinder torque production from the mean. The sum of the absolute values of IP over an engine cycle is then an indication of the torque variation from cylinder to cylinder during this cycle. Large values for the roughness index indicate large variations in cylinder to cylinder torque production which results in increased engine roughness. Thus, the value for $\hat{R}_i$ is a quantifiable measure of engine roughness.

The roughness index may be used in a feedback control system such as a closed-loop idle mode controller, or as a tool for evaluating engine control strategies.

A COMBUSTION EFFICIENCY MONITOR

Figure 5:
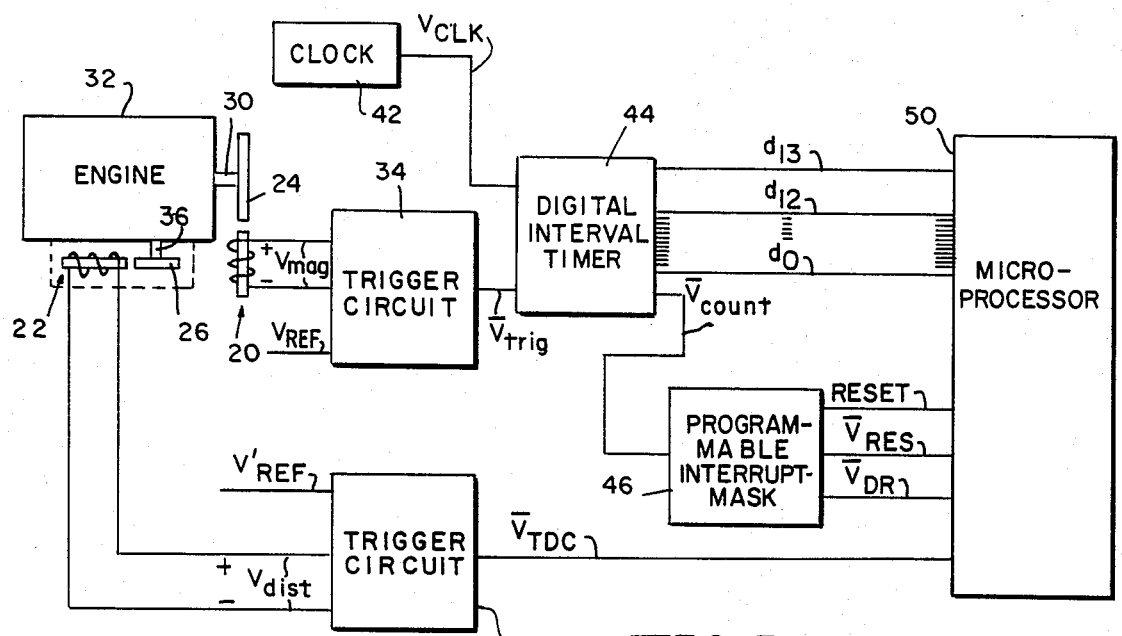
FIG. 5 is a block diagram of a system constructed according to the present invention for determining the relative combusion efficiencies of the cylinders of a multiple cylinder spark ignition internal combustion engine.

A schematic diagram of the system used for determining the relative combustion efficiency measure on a spark ignition engine is shown in FIG. 5. A pair of magnetic pick-ups 20, 22 are mounted in close proximity to rotating, multitooth wheels 24, 26, respectively. One wheel 24 is mounted to the crankshaft 30 of a multiple cylinder internal combustion engine 32. Wheel 24 is used in conjunction with the associated magnetic pick-up 20 and an associated trigger circuit 34 to generate a signal at fixed angular positions of the crankshaft 30. The second wheel 26 is mounted to the engine 32 distributor shaft 36. Wheel 26, the associated magnetic pick-up 22, and a trigger circuit 40 are used in generating a reference to top dead center of the beginning of the power stroke in each cylinder of engine 32.

A clock 42 provides pulses at 5 MHz to a digital interval timer (DIT) 44. DIT 44 includes fourteen parallel outputs $d_0, d_1, d_2 \ldots d_{12}, d_{13}$, and a $\overline{V}_{count}$ output. $\overline{V}_{count}$ is coupled to an input of a programmable interrupt mask (PIM) 46. Trigger circuits 34, 40 provide signal conditioning for the output signals of the magnetic pick-ups 20, 22, respectively. Clock 42 and DIT 44 measure the elapsed time for successive fixed angular rotations of the crankshaft 30. DIT 44 and PIM 46 generate and transmit signals to a microprocessor 50. The microprocessor 50 receives the data from the other electronic circuitry, and performs the filtering and calculations necessary to determine the relative combustion efficiency measure.

The operation of this system is described below. As each tooth of the wheel 24 passes the stationary magnetic pick-up 20, a voltage, $v_{mag}$, is generated. When $v_{mag}$ exceeds a reference voltage, $V_{REF}$, the trigger voltage, $\overline{V}_{trig}$, goes low (0 volts). A low $\overline{V}_{trig}$ signal to the DIT 44 causes the contents of a 16-bit up-counter in the DIT 44 to be loaded in parallel into a 16-bit latch at the output of the DIT 44. The low $\overline{V}_{trig}$ signal also causes the up-counter in DIT 44 to be cleared, and counting of the high frequency clock pulses, $V_{CLK}$, to be resumed. Further, the low $\overline{V}_{trig}$ signal causes the $\overline{V}_{count}$ line from the DIT 44 to the PIM 46 to go low to indicate that data is ready for processing. Finally, as $\overline{V}_{trig}$ goes low, depending on the state of the RESET line from the microprocessor 50 and an internal signal, the PIM 46 either transmits the "data ready" signal to the microprocessor 50 by setting the $\overline{V}_{DR}$ line low, or blocks the "data ready" signal from the microprocessor 50 by holding the $\overline{V}_{DR}$ line high.

Upon receipt of a low $\overline{V}_{DR}$ signal, the microprocessor 50 reads the contents of the 14 least significant bits of the latch, $d_0$–$d_{13}$. This 14-bit number is proportional to the time for two successive teeth of the multitooth wheel 24 to pass the magnetic pick-up 20. After the contents of the latch are read, the microprocessor 50 toggles the $\overline{V}_{RES}$ line to acknowledge that the data has been read. This causes the $\overline{V}_{DR}$ line to go high. The data read by the microprocessor 50 is filtered using digital filtering. The filtered data is used to calculate a combustion efficiency measure ($IP_k$) for each cylinder as will be described.

The second magnetic pick-up 22 mounted adjacent the distributor generates a voltage, $v_{dist}$, at the passage of each lobe of the fitting 26 connected to the distributor shaft 36. This fitting 26 has one lobe for each cylinder of the engine 32 and is positioned such that the output of the trigger circuit, $\overline{V}_{TDC}$, makes a high-to-low transition coincident with the corresponding cylinder reaching TDC. The $\overline{V}_{TDC}$ line remains low for approximately 60 micro-seconds and then returns high. The $\overline{V}_{TDC}$ signal is used by the microprocessor 50 both to reference top dead center and, in conjunction with a clock on board the microprocessor, to determine engine 32 speed.

Figure 6:
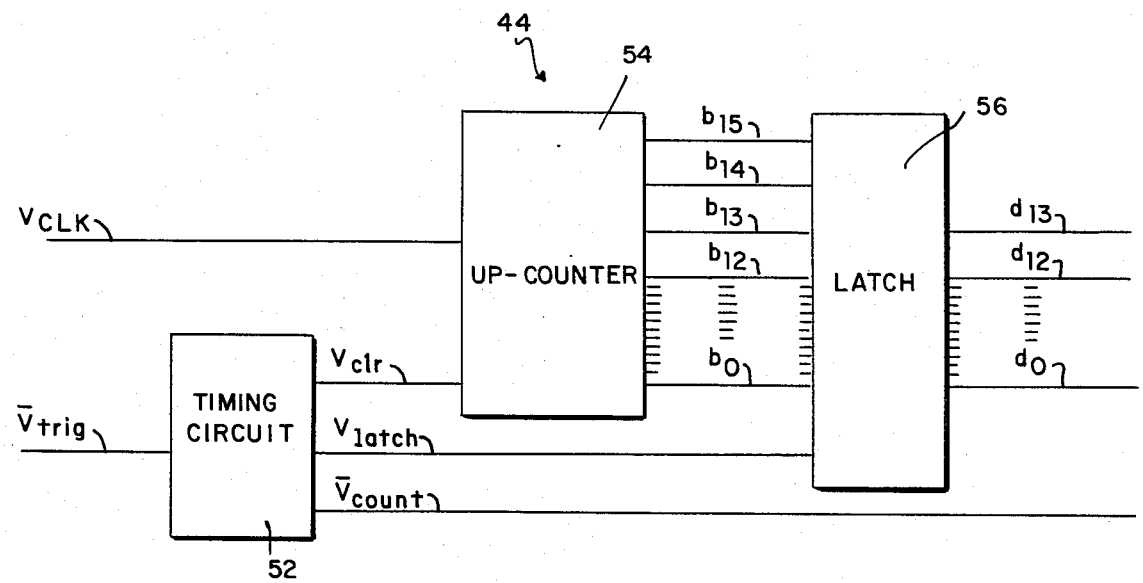
FIG. 6 is a block diagram of a portion of the system illustrated in FIG. 5.
Figure 7:
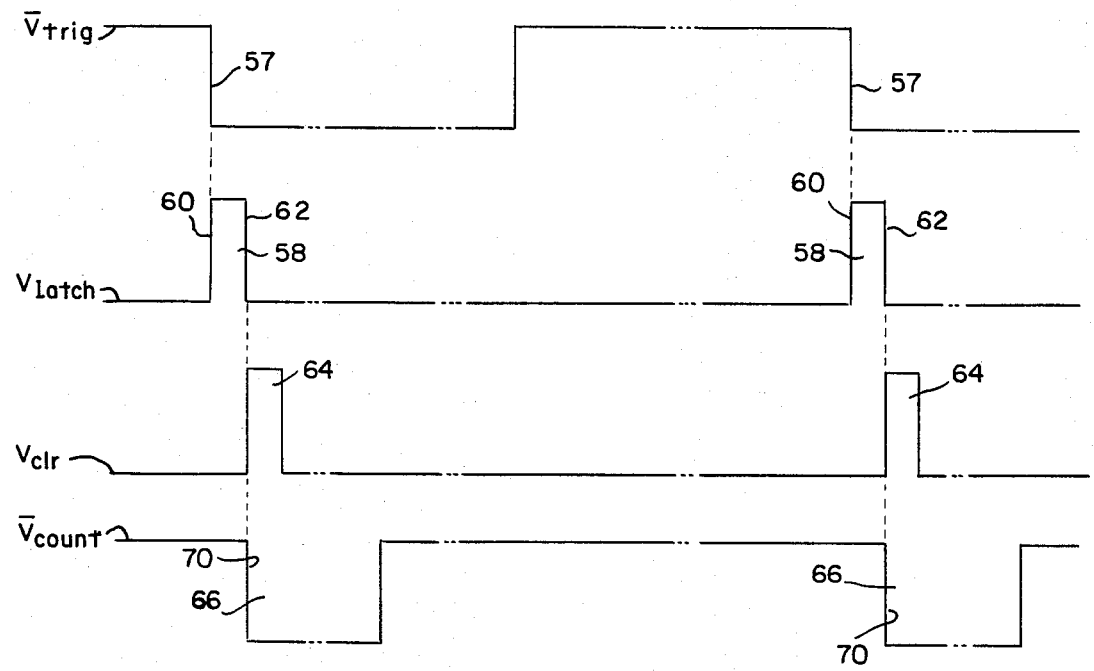
FIG. 7 is the timing diagram of the circuit illustrated in FIG. 6.

The schematic of the DIT 44 circuit is shown in FIG. 6. The three basic components of this circuit are a timing circuit 52, an up-counter 54, and a latch 56. The timing diagram for the DIT 44 is shown in FIG. 7.

The $\overline{V}_{trig}$ signal is the input to the timing circuit 52. The outputs of circuit 52 are $V_{clr}$, $V_{latch}$, and $\overline{V}_{count}$. On the falling edge 57 of the $\overline{V}_{trig}$ signal (FIG. 7), the timing circuit 52 generates a pulse 58 (FIG. 7) of approximately 75 n-sec duration on the $V_{latch}$ line. On the rising edge 60 (FIG. 7) of the $V_{latch}$ signal, the contents of the up-counter 54 are loaded in parallel into the 16-bit latch 56, and appear at the output $d_0, \ldots d_{13} \ldots$ of the latch 56. On the falling edge 62 (FIG. 7) of the $V_{latch}$ signal, a 75 n-sec positive pulse 64 appears on the $V_{clr}$ line, causing the up-counter 54 to be reset at zero. Counting resumes when the $V_{clr}$ line goes low at the end of the pulse 64. Also on the falling edge 62 of the $V_{latch}$ pulse, the $\overline{V}_{count}$ line goes low, at 66 in FIG. 7, for approximately 8.8 μ-sec.

The PIM 46 has two functions, one to mask from the microprocessor 50 that data which is not needed in calculating the combustion efficiency measure, and also to hold the data ready line, $\overline{V}_{DR}$, low until the data has been read by the microprocessor 50. In the control system described here, a wheel 24 having sixty teeth is used. Thus, for a six-cylinder, four-stroke engine 32, twenty data points are measured for each engine firing (sixty teeth per revolution divided by three cylinders firing per revolution). Since nine data points per firing are used by the microprocessor 50 to calculate the combustion efficiency measure, eleven unneeded data points are successively latched onto the output $d_0 \ldots d_{13}$ of the DIT 44 for each firing. The PIM 46 prevents the data ready signal $\overline{V}_{DR}$ corresponding to these unnecessary data points from being transmitted to the microprocessor 50, thus allowing the microprocessor 50 to continue program execution without undue interruptions.

When a new data point has been latched onto the output $d_0 \ldots d_{13}$ of the DIT 44, it generates a low pulse of approximately 8.8 μ-sec duration on the $\overline{V}_{count}$ line. The PIM 46 masks some of these signals from the microprocessor 50, and transmits others via the $\overline{V}_{DR}$ line. When a data point that is to be transmitted to the microprocessor 50 becomes available at the latch 56, the $\overline{V}_{DR}$ line from the PIM 46 is brought low on the falling edge 70 of the $\overline{V}_{count}$ pulse. The $\overline{V}_{DR}$ line will remain low until the microprocessor 50 has read the data point and acknowledges that the point has been read by toggling the $\overline{V}_{RES}$ line.

Figure 8:
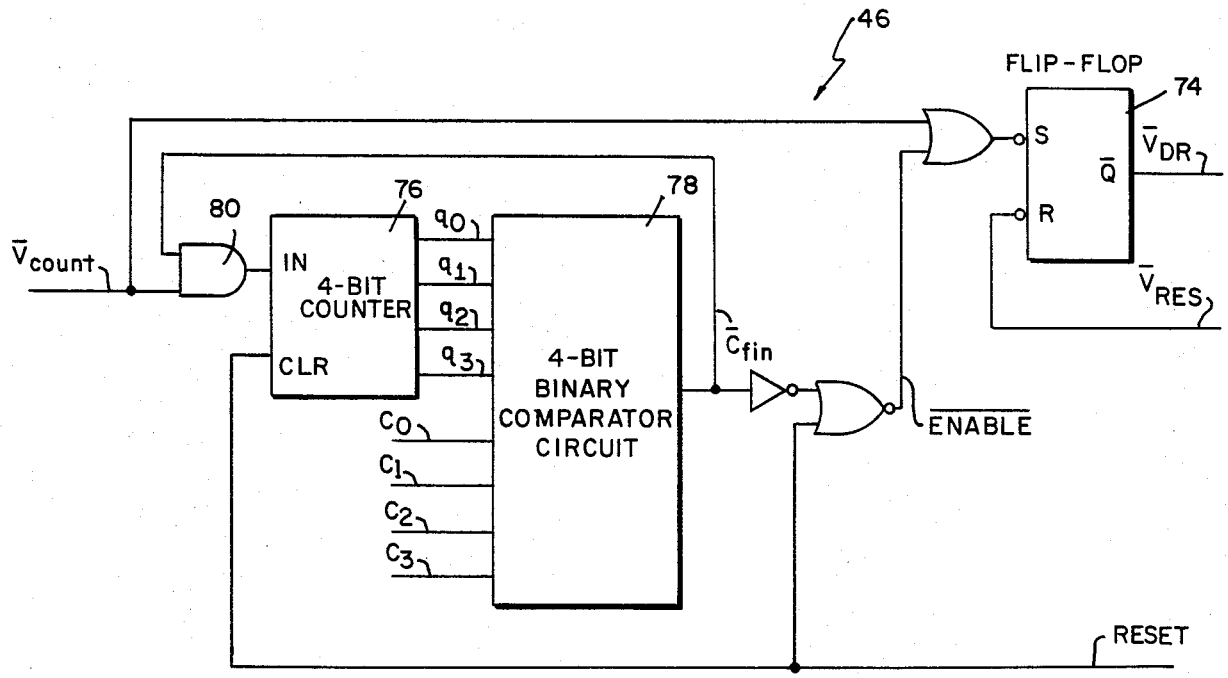
FIG. 8 is a block diagram of another portion of the circuit illustrated in FIG. 5.

In FIG. 8, the schematic diagram of the PIM 46, the inputs to the PIM 46 are $\overline{V}_{count}$, $\overline{V}_{RES}$, and RESET. The output is $\overline{V}_{DR}$. During the masking operation of the PIM 46, the $\overline{ENABLE}$ line is held high, blocking the $\overline{V}_{count}$ signals from being transmitted to the S input of a SET-RESET flip-flop 74. This causes the $\overline{V}_{DR}$ line to be held high. The $\overline{ENABLE}$ line becomes active (low) when either the RESET line from the microprocessor 50 (FIG. 5) is brought high, or the $\overline{C}_{fin}$ line goes low. A low $\overline{ENABLE}$ causes the $\overline{V}_{count}$ signals to be transmitted to the flip-flop 74. Upon receipt of a low signal at the S input, the output of the flip-flop 74, $\overline{V}_{DR}$, goes low and remains low until the R input, $\overline{V}_{RES}$, is brought active low by the microprocessor 50.

A 4-bit binary counter 76 is used in the PIM 46 to keep track of the number of data points being masked from the microprocessor 50. When the RESET line is high, the counter 76 is disabled and the outputs $q_0$–$q_3$, are held at zero. Once the RESET line is brought low, the counter 76 is enabled. The output, $\overline{C}_{fin}$, of a four-bit binary comparator circuit 78 is low whenever the output $q_0$–$q_3$ of the binary counter 76 matches the four-bit binary word $c_0$–$c_3$ which is entered via a set switches (not shown). This binary word $c_0$–$c_3$ sets the number of data points that will be masked from the microprocessor 50 following the high-to-low transition of the RESET line. When the RESET line is initially brought low, the output of the binary counter 76 is zero; assuming that $C_0$–$C_3$ are not all zero, the comparator 78 output, $\overline{C}_{fin}$, will be high. This enables the $\overline{V}_{count}$ signal to be transmitted to the input of the counter 76 through an AND gate 80. The binary counter 76 increments by one for each high-to-low transition of the $\overline{V}_{count}$ line. When output 90–93 of the counter 76 matches the value set by $c_0$–$c_3$, the $\overline{C}_{fin}$ line will go low. This causes the $\overline{ENABLE}$ line to become active and permits subsequent $\overline{V}_{count}$ pulses to be transmitted to the flip-flop 74. Simultaneously, further pulses of $\overline{V}_{count}$ are blocked from the input of the counter 76 by the low condition of the $\overline{C}_{fin}$ line and AND gate 80 input coupled to $\overline{C}_{fin}$, until the counter 76 is cleared by a high signal from the RESET line.

Figure 9:
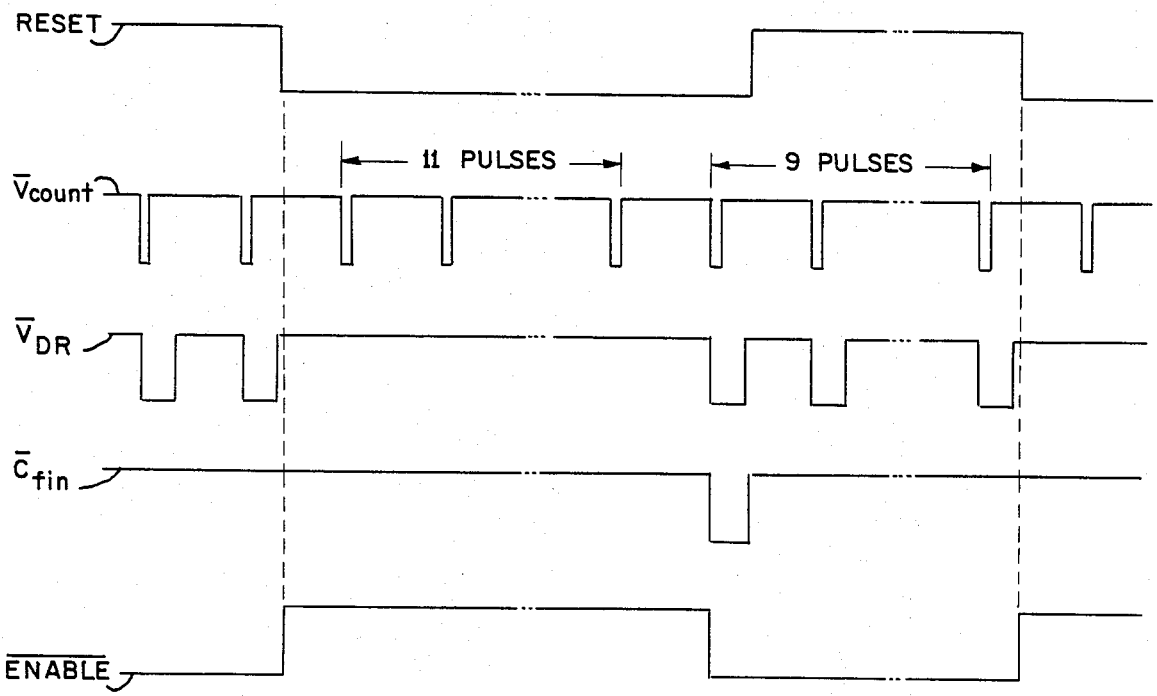
FIG. 9 is the timing diagram of the circuit illustrated in FIG. 8.

Returning to FIG. 5, on start-up of the engine 32 control program, the microprocessor 50 activates the RESET line, thus enabling the $\overline{V}_{count}$ pulses to be transmitted through the PIM 46. Using $\overline{V}_{TDC}$ as a reference to TDC, the microprocessor 50 synchronizes the datataking operations with the crankshaft 30 position. This is done by counting the number of $\overline{V}_{DR}$ pulses following the first $\overline{V}_{TDC}$ pulse. When the proper number of $\overline{V}_{DR}$ pulses have been received, the microprocessor 50 begins to read the data from the DIT 44 output $d_0$–$d_{13}$ on each $\overline{V}_{DR}$ pulse. Nine data points are read, and then the microprocessor 50 brings the RESET line low to mask the next 11 data points. This is illustrated in the timing diagram in FIG. 9. The next 11 $V_{count}$ pulses are masked from the microprocessor 50 by the PIM 46. On the twelfth $\overline{V}_{count}$ pulse following the high-to-low transition of the RESET line, $\overline{C}_{fin}$ goes low enabling the $\overline{V}_{DR}$ line. That is, the twelfth pulse of $\overline{V}_{count}$ is transmitted to the microprocessor 50 on the $\overline{V}_{DR}$ line. Upon receipt of the first $\overline{V}_{DR}$ pulse, the microprocessor 50 sets the RESET line high and holds it high until nine more data points have been read. The RESET line is then brought low to again initiate the masking operation. This process is repeated as long as the program is in operation.

COMBUSTION EFFICIENCY-BASED ENGINE CONTROLS

The problem of delivering a uniform mixture of air and fuel to each cylinder of a multicylinder internal combustion engine is well known. In carbureted engines and engines with single point fuel injection systems, it is difficult to design an intake manifold capable of distributing the mixture of air and fuel equally among the cylinders. Even in multipoint fuel injection systems (in either spark or compression ignition engines), there will be variation in the amount of fuel delivered to the cylinders due, e.g., to tolerance variations in the injectors.

The optimum ignition timing in spark ignition engines or optimum injection timing in diesel engines for the efficient combustion of an air/fuel mixture is a function of, among other parameters, the mass of fuel and the ratio of air to fuel in the cylinder. The controls described herein adjust the timing to each cylinder independently, thus compensating for the non-uniform distribution of air and fuel among the cylinders. The timing is set for the most efficient combustion of the mixture in each cylinder.

Engine crankshaft speed information is used to calculate a relative combustion efficiency measure for each cylinder. This combustion efficiency measure is used as the basis for adjusting the timing to the individual cylinders. As the composition of the combustible mixture to the cylinders changes with changing engine operating conditions, the control continues to adjust the timing for optimum combustion.

Figure 10:
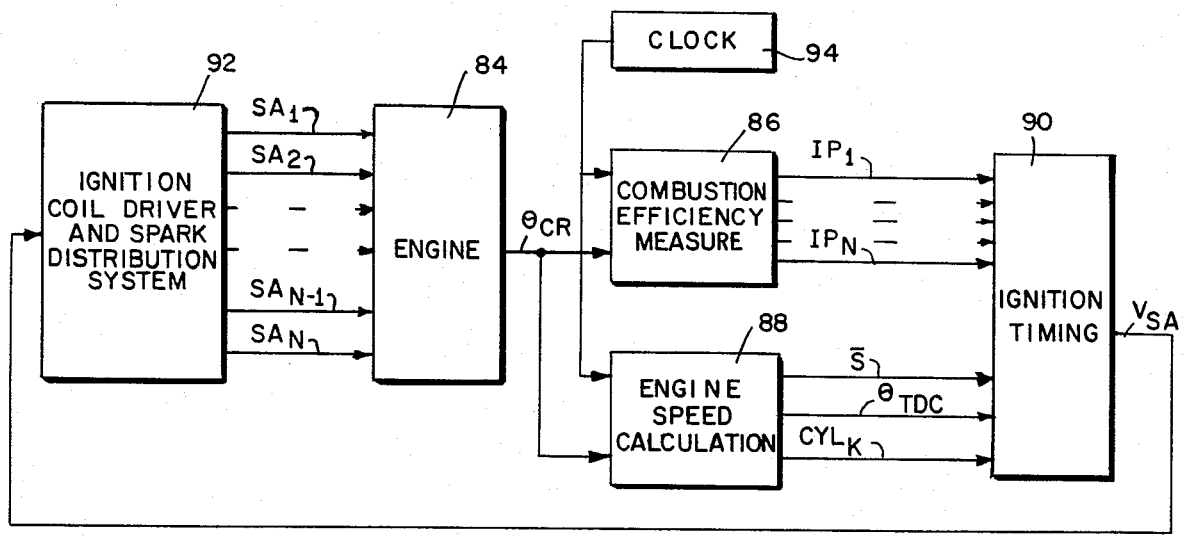
FIG. 10 is a block diagram of a system for controlling the performances of individual cylinders of a multiple cylinder internal combustion engine according to the present invention.

A block diagram illustration of a control system implemented on a spark ignition engine is shown in FIG. 10. The engine 84 crankshaft position, $\theta_{CR}$, as a function of time is used by a combustion efficiency measure calculation system 86 to derive a relative combustion efficiency measure ($IP_k$) for each cylinder in engine 84. An engine speed calculation system 88 uses the crankshaft position $\theta_{CR}$ as a function of time to calculate the mean engine speed, $\overline{S}$, to generate a reference to top dead center, $\theta_{TDC}$, and to index the cylinder position in the firing order, $CYL_k$. An ignition timing system 90 determines the optimum spark advance for each cylinder based on the combustion efficiency measure $IP_k$ from system 86 and the mean engine speed $\overline{S}$ from system 88. The cylinder index, $CYL_k$, mean engine speed, $\overline{S}$, and top dead center reference, $\theta_{TDC}$, are used to time the ignition signal, $V_{SAk}$, transmitted to the ignition coil driver and spark distribution system 92 to assure the proper spark advance to each cylinder of engine 84. A clock 94 generates the time base for the time-dependent functions of systems 86, 88.

Figure 11:
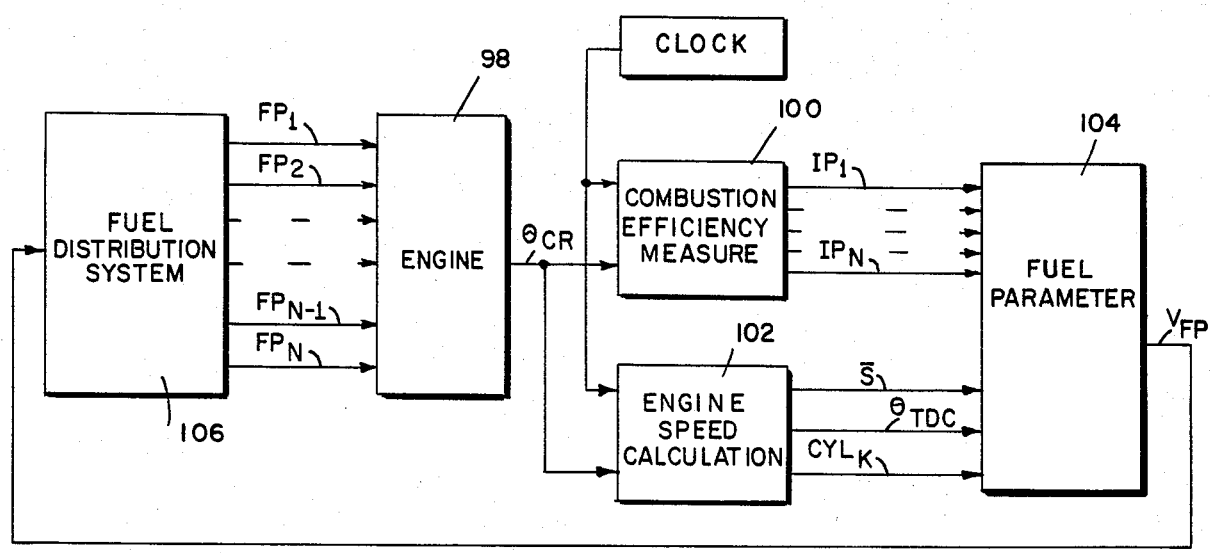
FIG. 11 is a block diagram of a system for controlling the performances of individual cylinders of a multiple cylinder internal combustion engine according to the present invention.

The implementation of this control on a compression ignition engine is illustrated in FIG. 11. In this application, the fuel injection timing, $FP_k$, to each cylinder, $CYL_k$, is the controlled variable. The engine 98 crankshaft position, $\theta_{CR}$, as a function of time is used by a combustion efficiency measure calculation system 100 to derive a relative combustion efficiency measure ($IP_k$) for each cylinder in engine 98. An engine speed calculation system 102 uses the crankshaft position, $\theta_{CR}$, as a function of time to calculate the mean engine speed, $\overline{S}$, to generate a reference to top dead center, $\theta_{TDC}$, and to index the cylinder position in the firing order, $CYL_k$. A fuel parameter (in this case, injection timing) system 104 determines the optimum fuel injection timing for each cylinder in engine 98 based on the combustion efficiency measure $IP_k$ and the mean engine speed $\overline{S}$. The cylinder index, $CYL_k$, mean engine speed, $\overline{S}$, and top dead center reference, $\theta_{TDC}$, are used to time the fuel injection signal, $V_{FPk}$, transmitted to the fuel distribution system 106 to assure the proper fuel injection timing to each cylinder.

It should be noted that the fuel system parameter $FP_k$ controlled could also be fuel amount injected (controlled, for example by injector nozzle open time or fuel system pressure adjustment), or some combination of fuel injection timing and amount of fuel injected.

Another control strategy using the inventive control system makes use of the fact that the fuel consumed by an idling engine is proportional to the engine speed—the lower the speed, the less fuel used. However, as the engine speed is lowered, the engine tends to run rougher. The optimum engine idle speed is the lowest speed at which the roughness is not objectionable. This speed changes with both engine operating and environmental conditions. An adaptive idle speed control system is based upon the system described above.

Figure 12:
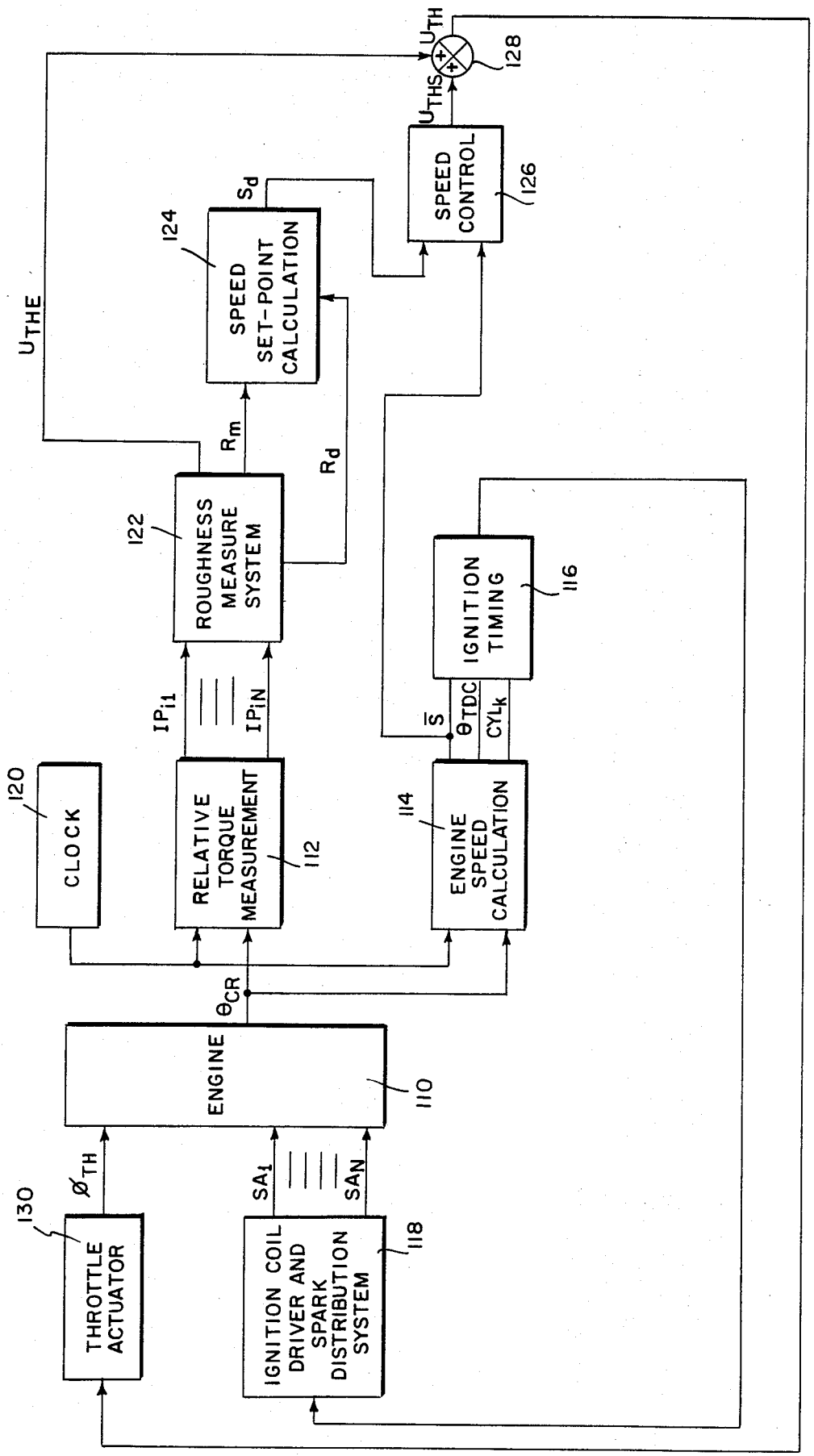
FIG. 12 is a block diagram of a system for controlling the idle speed of a multiple cylinder internal combustion engine constructed according to the present invention.

The idle mode control system is shown in FIG. 12. The idle control seeks to maintain the lowest engine speed consistent with a preset desired engine roughness level, $R_d$, under any combination of engine operating and environmental conditions. The speed is controlled by manipulating the throttle via associated control and power circuitry (throttle actuator).

The engine crankshaft position, $\theta_{CR}$, as a function of time is used by a relative torque calculation system to derive the index of performance ($IP_{ik}$) for each firing of each cylinder in the engine. A roughness measure calculating system uses the $IP_{ik}$ to derive a roughness index, $\hat{R}_i$, for each engine cycle. This roughness index is then filtered to produce the measured engine roughness, $R_m$. The speed set-point calculating system compares the measured engine roughness with a preset roughness set-point, $R_d$, and adjusts the speed set-point, $S_d$, to reduce the error between $R_d$ and $R_m$.

An engine speed calculating system uses the crankshaft position as a function of time to calculate the mean engine speed, $\overline{S}$, to generate a reference to top dead center, $\theta_{TDC}$, and to index the cylinder in the firing order. A speed control system filters the mean engine speed to determine a measured engine speed $S_m$. The measured engine speed and speed set-point are compared. The throttle actuating signal, $u_{THS}$, is determined in such a way as to reduce any error between the measured engine speed and speed set-point. The throttle actuator translates the electronic signal from the speed control unit into actual throttle motion, $\phi_{TH}$.

An ignition timing system uses the mean engine speed, $\bar{S}$, top dead center reference signal, $\theta_{TDC}$, and cylinder index $CYL_k$ to time the signal, $V_{SAk}$, transmitted to the ignition coil drive and spark distribution system to assure proper spark advance to each cylinder of the engine.

In addition, the roughness measurement system may generate a throttle actuator signal, $u_{THE}$, to initiate emergency throttle action in the event that the engine is about to stall. This emergency throttle action signal is based upon the individual cylinder index of performance and gives a much earlier indication of sudden drops in speed than the measured engine speed value, $S_m$.

The desired roughness set-point, $R_d$, is modified based on the frequency with which emergency action is required. The need for frequent emergency action indicates that the engine is operating in a region very near the point where it will stall. This condition suggests that the roughness set-point has been set too high. Thus, when the frequency with which emergency action is initiated exceeds a limiting value, the roughness set-point is decreased. This feature allows the idle mode controller to adapt to the engine and the environment in which it is being used. The addition of the adaptive feature frees the controller from dependence on pre-set calibrations.

Other control variations and strategies are possible with the system of the present invention. For example, an improved knock control scheme uses the concept of controlling the ignition timing to each cylinder independently. The usual corrective action for an engine which is knocking is to retard the ignition timing to all cylinders until the knock level is within acceptable limits. The retarded ignition timing causes a loss of power in the engine. In general, not all cylinders are simultaneously knocking. The knock detected may be due to but one of the cylinders. With the inventive control system, the specific cylinder or cylinders that are knocking are identified. Then the ignition timing to these cylinders alone is retarded, resulting in less power loss than if the ignition timing were retarded to all cylinders.

As another example, retarding the ignition timing in general results in lower emission levels. However, retarded ignition timing also causes poorer engine performance and fuel efficiency. In a technique for reaching the best compromise between these phenomena, the ignition timing is retarded selectively to the individual cylinders.

It has been shown in previous experimental work that the ignition timing can be retarded to some cylinders with very little loss of engine torque, while retarding the ignition timing to other cylinders under the same operating conditions results in considerable loss of engine power. By monitoring the combustion efficiency of each cylinder as described above, the effect of retarding the ignition timing on individual cylinders is measured. The ignition timing is then retarded by the maximum amount to each cylinder without causing an undue loss of engine operating efficiency.

Yet another application of the described control system is in the field of lean limit controls. The emission levels of all three of the exhaust components covered by government standards (CO, HC, NOx) decrease as the air/fuel mixture to the engine is made leaner. The lean burn concept of engine control makes use of this fact by driving the air/fuel mixture as lean as possible while still maintaining satisfactory engine performance. This action simultaneously results in improved fuel economy. As the air/fuel mixture is made leaner, it reaches a point (the lean limit) at which the engine begins to misfire, degrading the engine performance and increasing the levels of unburned hydrocarbons dramatically. If the mixture is made leaner than the lean limit, the engine stalls.

The control system described herein can employ the lean burn control strategy by continually seeking the mixture ratio just richer than the lean limit. In this arrangement, the mixture ratio is continually driven leaner while the combustion efficiency measure is calculated and used to detect the onset of misfire. As the engine operating conditions change, the control system continues to seek the new lean limit.

In another application, it is known that the properties of the fuel used in an engine have a significant effect on the performance of the engine. The controls, such as ignition timing, air/fuel ratio, or fuel injection timing, for optimum operation in terms of fuel economy, emission levels, and performance are dependent on the properties of the fuel used. In the case of spark ignition engines, the control system described adjusts the ignition timing to the optimum value for the particular fuel used. For compression ignition engines, the timing of fuel injection and quantity of fuel injected are adjusted. Thus, compensation is provided for the normal variations in the properties of a given grade of fuel that occur as a result of the refining process.

The control technique described is extended directly to permit different grades of fuel to be burned in a given engine without modification to that engine. This permits the engine to be operated on a range of fuels without loss of performance. Thus, the operator of a vehicle is free to choose from, for example, unleaded gasoline or gasahol with varying alcohol contents, dependent on local availability. Independent of the fuel used, the control system adjusts the ignition timing to the optimum value.

Additionally, the combustion efficiency measure is used as a tool for on-line engine diagnostics. The combustion efficiency measure is an indication of the performance of each cylinder relative to the other cylinders. Identification of a cylinder with consistently poor performance under all operating conditions may signify, for example, that the spark plug in that cylinder is not firing (in a spark ignition engine). Similarly, in a compression ignition engine, a cylinder which shows a combustion efficiency measure consistently below the average may indicate a malfunctioning fuel injector.

The combustion efficiency measure can also be used in evaluating designs of air/fuel delivery systems for engines. For optimum operation, the air/fuel delivery system should distribute the air and fuel evenly among the cylinders. Uneven distribution of the air and fuel results in uneven torque production among the cylinders. Since the combustion efficiency measure is an indication of the relative torque production level of each cylinder, variations in the combustion efficiency measure among the cylinders are useful as a measure of the distribution.

The implementation of this control on a spark ignition engine is illustrated in FIG. 12. In this application, the engine 110 crankshaft position, $\theta_{CR}$, as a function of time, is used by a combustion efficiency measure calculation system 112 to derive a relative combustion efficiency measure (IP$_{ik}$) for each cylinder in engine 110. An engine speed calculation system 114 uses the crankshaft position $\theta_{CR}$ as a function of time to calculate the mean engine speed, $\overline{S}$, to generate a reference to top dead center, $\theta_{TDC}$, and to index the cylinder position in the firing order, CYL$_k$. An ignition timing system 116 determines the optimum spark advance for each cylinder based on the crankshaft position, the top dead center reference, and the cylinder position in the firing order from engine speed calculation system 114. The ignition timing system 116 supplies this information to an ignition coil driver and spark distribution system 118 to assure proper spark advance to each cylinder of engine 110. A clock 120 generates the time base for the time-dependent functions of systems 112, 114.

The roughness measure calculating system 122 of the present invention uses the indices of performance, IP$_{ik}$, to derive the roughness index which is filtered to provide the measure R$_m$, measured engine roughness. In addition, the engine roughness measure calculation system 122 provides an emergency throttle control signal u$_{THE}$, based upon the individual cylinders' indices of performance. The signal u$_{THE}$ provides an essentially immediate indication that emergency throttle action is necessary to prevent the engine 110 from stalling. The signal R$_m$ is passed to a speed set-point calculation system 124 wherein the measured roughness is compared with a continuously updated desired roughness set-point signal R$_d$. The desired speed output signal S$_d$ from the speed set-point calculation system 124 is supplied to an engine speed control comparator 126 wherein it is compared to the mean engine speed signal, $\overline{S}$, provided by the engine speed calculation system 114. A non-emergency throttle control signal u$_{THS}$ is provided by the speed control 126. The signal, u$_{THS}$, is summed in a summer 128 with the emergency throttle control signal u$_{THE}$ provided by the roughness measure calculating system 122 to generate the throttle actuator signal u$_{TH}$ which is fed back to the throttle actuator 130 of the system. The output $\phi_{TH}$, throttle position, provided by throttle actuator 130, controls the position of the engine 110 throttle.

FIG. 13 illustrates a generalized form for the program control flow chart. After the program starts and all variables are initialized, the program enters a background routine. The background routine for an engine performance controller constructed in accordance with the present invention is illustrated in FIG. 14a. In this routine, the program waits for interrupts to go to a filter sub-routine. The program is in the filter sub-routine or one of its related sub-routines when the engine is under the control of the engine performance controller. The background routine for an engine performance monitor constructed according to the present invention is illustrated in FIG. 14m. In this routine, the program continuously scans a command keyboard for inputs which are basically commands for certain data to be outputted onto a CRT or screen. Upon the occurrence of such a command, the data requested is output to the screen, and the background routine returns to the scan mode.

The interrupts from FIG. 14a or FIG. 14m cause the program to enter a filter sub-routine, FILT, flow-charted at FIG. 14b. As discussed in connection with the six-cylinder, four-stroke cycle engine having a sixty-tooth wheel coupled to its crankshaft, for each combustion event nine data points centered about top dead center are used in engine performance calculation. In the filter sub-routine, a data point is first read and multiplied by a filter coefficient. Then, in a decision block, the program determines whether the last data point read is the last (ninth) data point to be read during the current combustion event. If it is not, a data point counter is incremented and the program returns to await the next data point. If the last data point read is the ninth data point, the counter is cleared and the nine data points centered about top dead center are used to calculate the index of performance. This is done by an index of performance sub-routine noted in the general flow chart of FIG. 13.

Figures 14C, 14D:
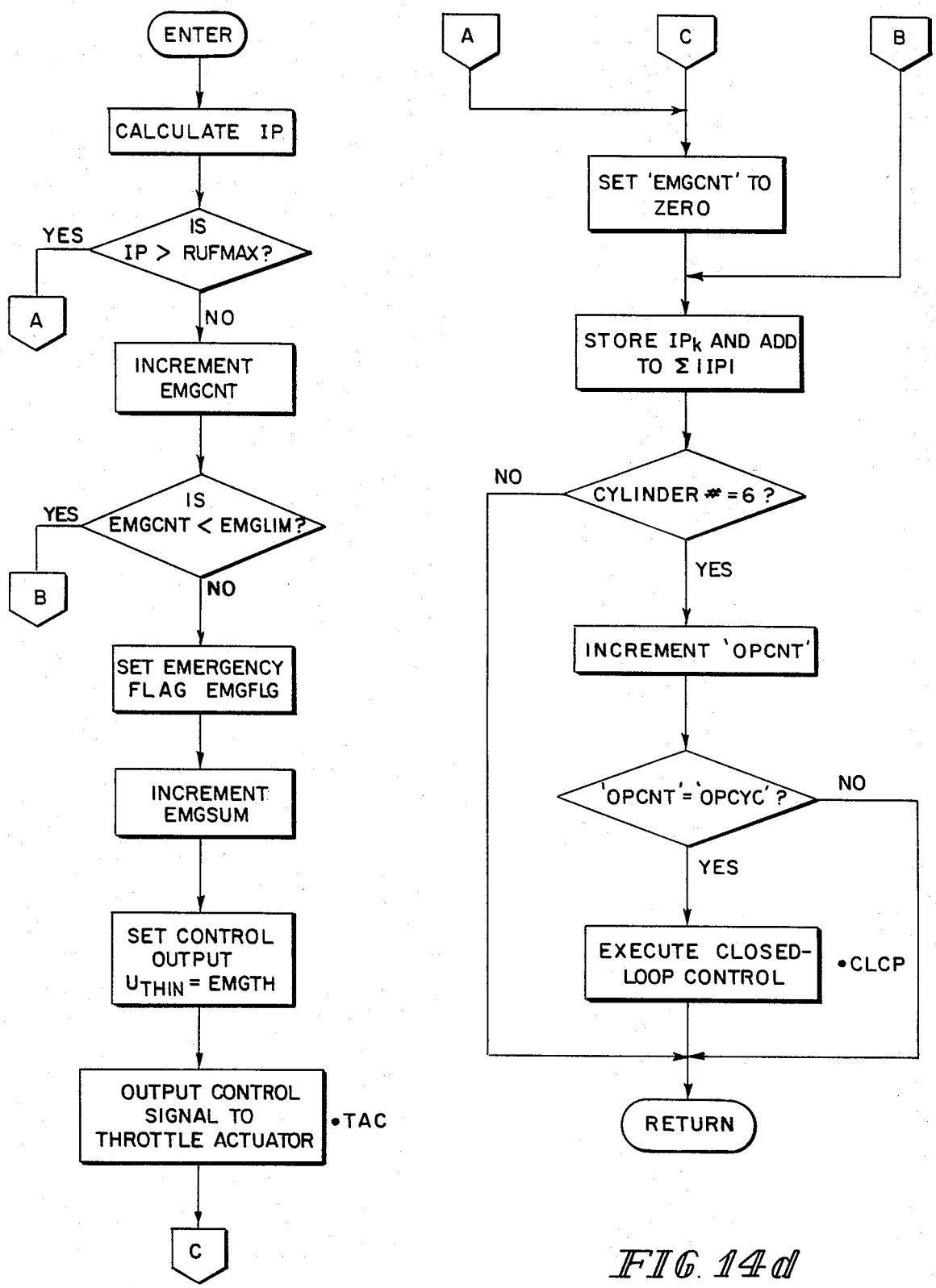

If the engine roughness control of FIG. 12 is being operated by the program, the index of performance sub-routine is as illustrated in FIGS. 14c–d. After the index of performance calculation is made as previously discussed, the index of performance sub-routine reaches a decision block in which the index of performance is compared to an unacceptable engine roughness level RUFEMG. An individual cylinder index performance not greater than RUFEMG causes the emergency counter EMGCNT to be incremented. EMGCNT is the number of successive cylinders in the firing order with indices of performances algebraically less than RUFEMG, the roughness level requiring emergency throttle action. In the next decision block, EMGCNT is compared to the emergency count limit, EMGLIM. EMGLIM is the number of successive "bad" cylinder firings needed to initiate emergency throttle action. If EMGCNT has reached the EMGLIM limit, the emergency flag EMGFLG is set, the cumulative emergency counter EMGSUM is incremented, and the throttle control output u$_{THIN}$ is set equal to EMGTH, after which a control signal is output to the throttle actuator through the throttle actuator control sub-routine illustrated in FIGS. 14j–14l.

EMGCNT is then set to 0, the index of performance of the cylinder is stored and its absolute value added to the sum of the absolute magnitudes of the indices of performance of the various cylinders. In the next decision block, the program asks whether the last cylinder whose index of performance was stored was the last cylinder in the firing order. If it was not, the sub-routine returns to begin the data collection and index of performance calculation process for the next cylinder. If the last cylinder whose index of performance was calculated was the last cylinder in the firing order, a counter OPCNT is incremented. In the next decision block, OPCNT is compared to OPCYC. If OPCNT does not equal OPCYC, the program returns to receive data relative to the next cylinder's index of performance. If OPCNT equals OPCYC, the program executes the closed-loop control sub-routine illustrated in FIG. 13 and at FIGS. 14e–14g.

Returning now to the decision block in FIG. 14c in which EMGCNT is compared to EMGLIM, if EMGCNT is less than EMGLIM, the index of performance of the cylinder is stored and its absolute value added to the sum of the absolute magnitudes of the indices of performance (FIG. 14d). The program next returns to the portion of the index of performance sub-routine beginning with the CYLINDER=6? decision block as before.

Returning now to the comparison of the index of performance against RUFEMG in FIG. 14c, if the index of performance is greater than RUFEMG, EMGCNT is set to 0, and the index of performance of the cylinder is stored and its absolute value added to the sum of the absolute magnitudes of the indices of performance. The index of performance sub-routine then goes into the CYLINDER=6? portion of the index of performance sub-routine as before.

Figure 14G:
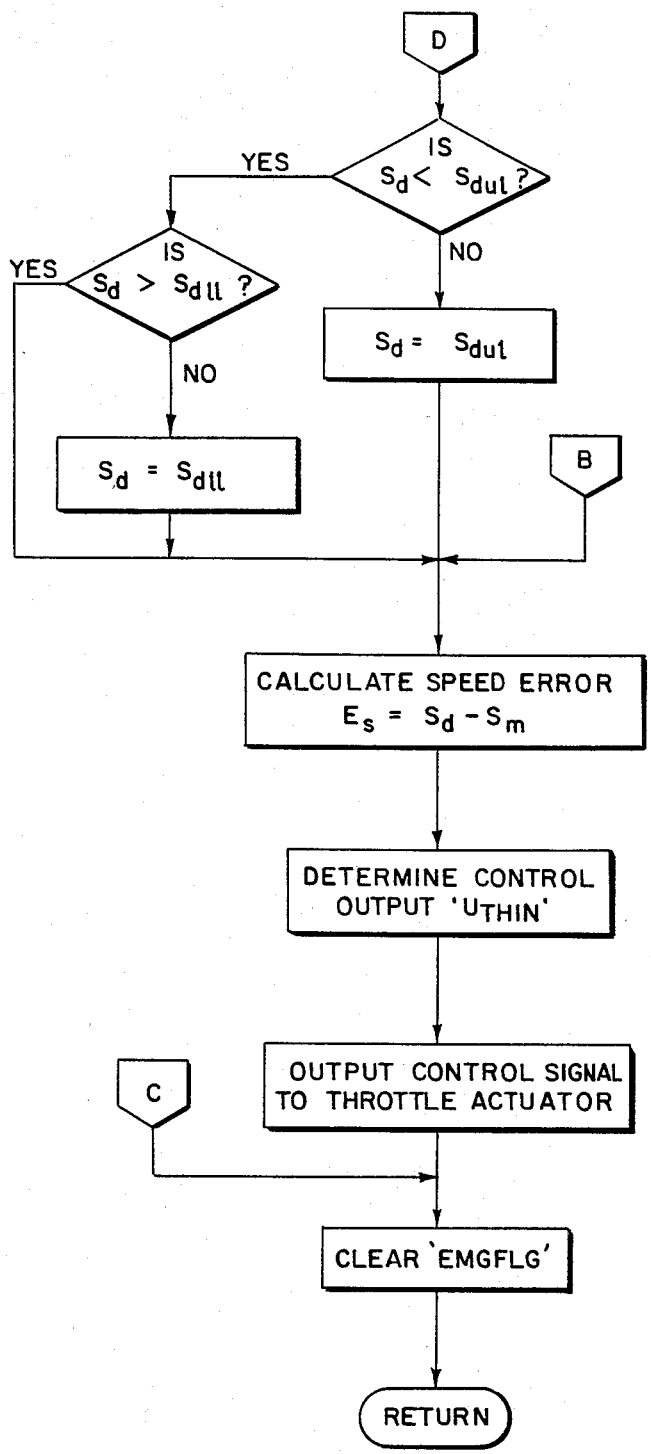

The closed-loop control program routine is illustrated in FIG. 13 and in detail in FIGS. 14e, 14f, and 14g. The program enters this routine and calculates and filters, in order, mean speed and roughness index. The mean speed calculation and filtering sub-routine SPCF is used to calculate and filter mean engine speed. The roughness index calculation and filtering sub-routine RCF is used to calculate and filter the roughness index. A roughness loop counter is then incremented. If EMGFLG, an emergency flag, is clear, the program then compares the count in this COUNTER to RUFCNT.

If EMGFLG is clear and COUNTER is less than RUFCNT, the program goes to FIG. 14g to calculate the speed error $E_s$ which equals the idle speed set-point $S_d$ minus the filtered engine mean speed $S_m$. Next, the program determines the control output $u_{THIN}$, the control output to the throttle actuator. This control output is the number of stepper motor control steps that the throttle actuator control is commanded to move. The control signal is next output to the throttle actuator. The emergency flag EMGFLG is then cleared and the system returns to the control of the index of performance (IPSUB) sub-routine.

If COUNTER is not less than RUFCNT, the counter is cleared. Referring now particularly to FIG. 14f, the closed-loop control program sub-routine continues with the decision block, IS EMGSUM<SUMLIM? If the answer is no, the roughness set point $R_d$ (FIG. 12), or RUFMAX (FIG. 14f), is reduced. The new value of RUFMAX is then stored. If EMGSUM is less than SUMLIM, or after the new value of RUFMAX is stored, EMGSUM is reset to 0. Then, the new speed set-point $S_d$ is calculated. Referring to FIG. 14g, the decision is made whether $S_d$ is less than $S_{dul}$. $S_{dul}$ is the idle speed set-point upper limit. This is the highest admissible idle speed set-point. If $S_d$ is not less than $S_{dul}$, then $S_d$ is set equal to $S_{dul}$. The program then calculates the speed error, $E_s$, which is set equal to $S_d-S_m$. Next, the program determines the control output $u_{THIN}$, the control output to the throttle actuator. The control signal is next output to the throttle actuator. The emergency flag EMGFLG is then cleared, and the system returns to the control of the index of performance sub-routine.

If $S_d$ is less than $S_{dul}$, the program goes to the decision block, $S_d>S_{dll}$? $S_{dll}$ is the idle speed set-point lower limit. This is the lowest admissible idle speed set-point. If $S_d$ is greater than $S_{dll}$, the program proceeds to a calculation of the speed error $E_s$ and continues in the manner previously described. If $S_d$ is not greater than $S_{dll}$, then $S_d$ is set equal to $S_{dll}$. The program then proceeds to a calculation of the speed error $E_s$ and continues in the manner described above.

Returning to FIG. 14e, if the emergency flag, EMGFLG, is not clear, the program clears EMGFLG, as illustrated in FIG. 14g and then returns to the index of performance sub-routine as illustrated in FIG. 13.

Figure 14H:
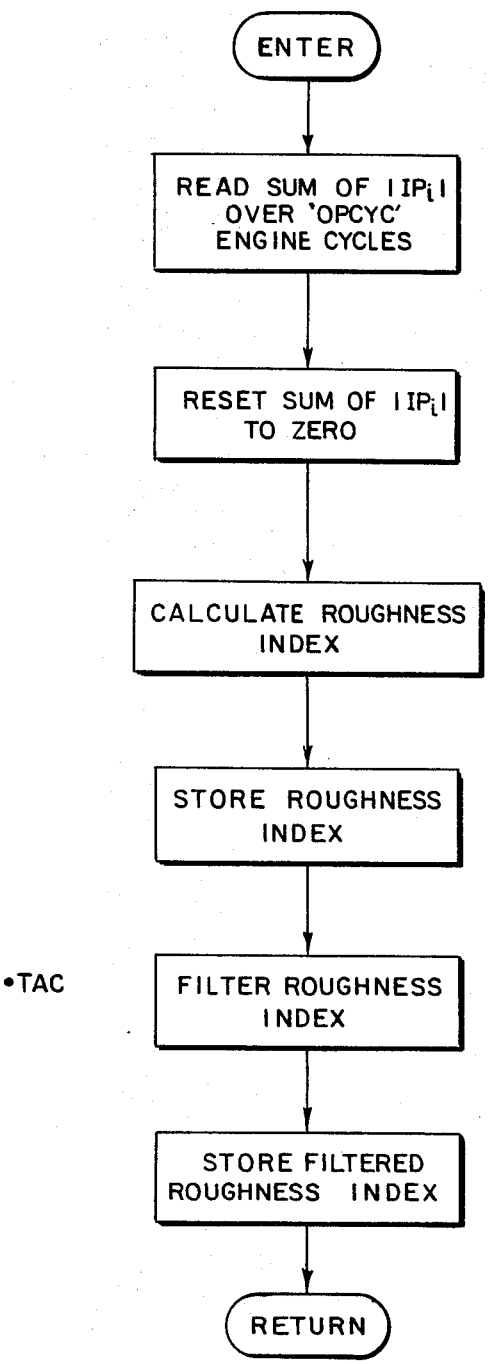

The roughness calculation and filter sub-routine (RCF) is illustrated in FIG. 14h. In this sub-routine, the sum of the absolute magnitudes of the indices of performance is obtained over the speed loop update interval OPCYC. Next, the sum of the absolute magnitudes of the indices of performance is reset to 0, and the roughness index R is calculated as discussed previously. The roughness index is stored, filtered, and the filtered roughness index is stored, and the program returns from the RCF sub-routine to CLCP sub-routine (FIG. 13).

Figures 14I, 14J:
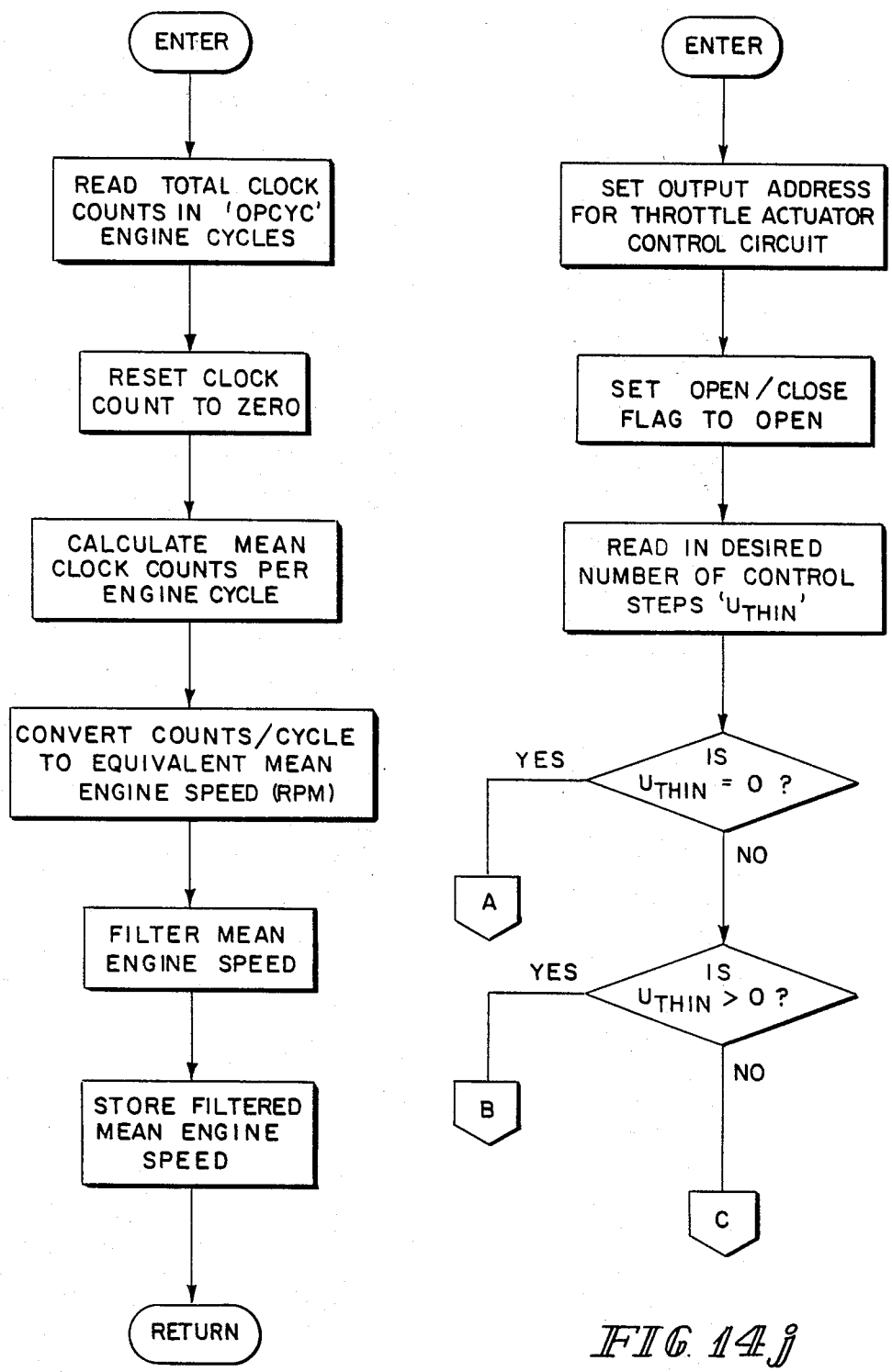

The mean engine speed calculation and filtering sub-routine SPCF is illustrated in FIG. 14i. In this sub-routine, the total number of clock counts in the OPCYC engine cycles, or OPCYC speed-loop update interval, are read, and the OPCYC clock count is reset to 0. The mean number of clock counts per engine cycle is then calculated. This sub-routine then converts the clock counts per cycle to equivalent mean engine speed (rpm). This mean engine speed is then filtered and stored, and the program returns from the SPCF sub-routine to the CLCP sub-routine (FIG. 13).

Figures 14K, 14L:
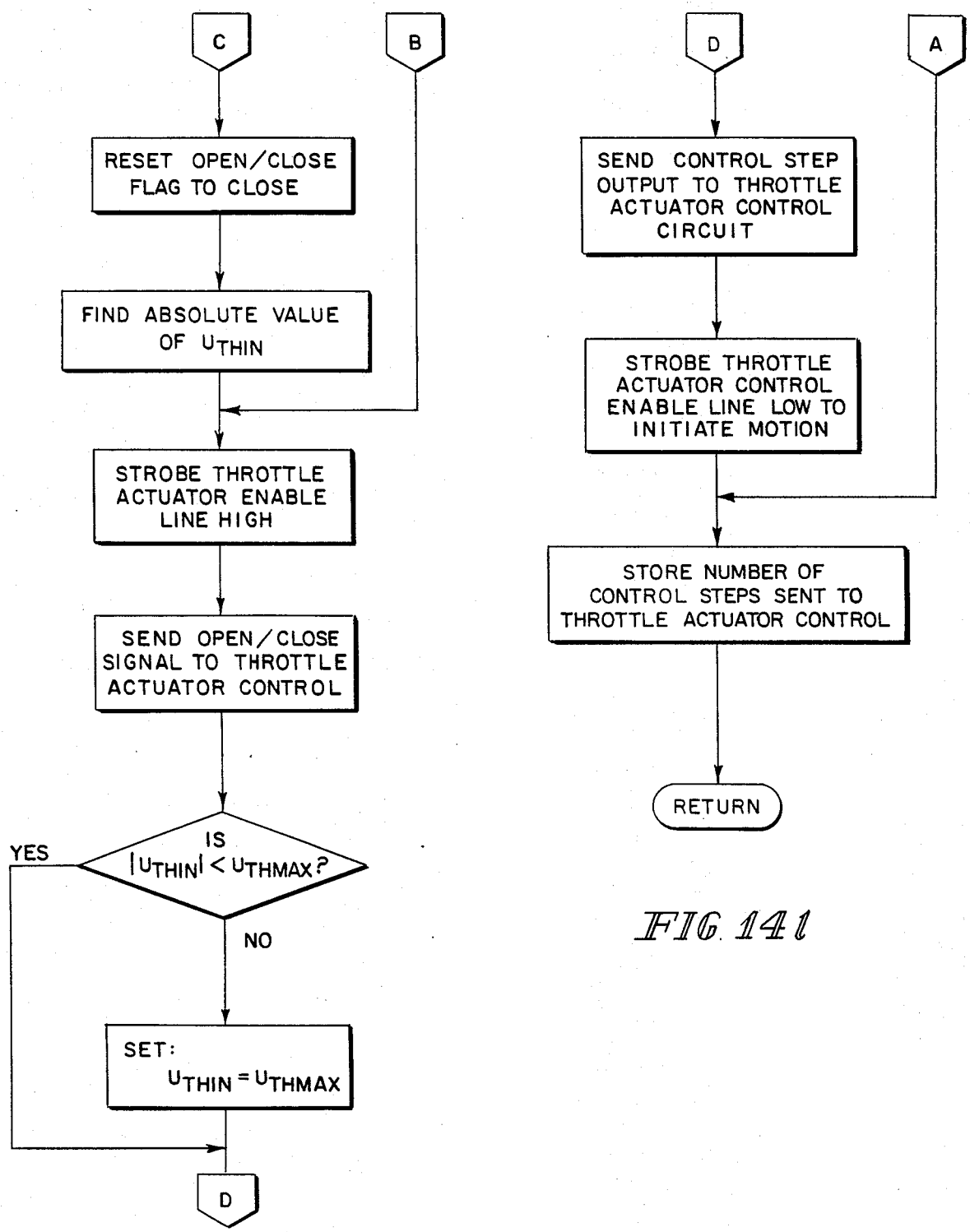

The throttle actuator control sub-routine TAC is illustrated in FIGS. 14j–14l. In this sub-routine, the output address for the throttle actuator control circuit is first set. Then, an open throttle/close throttle flag is set to open. The sub-routine then reads in a desired number of control steps, $u_{THIN}$. This is the control output to the throttle actuator, or the number of stepper motor control steps that the throttle actuator control is commanded to move. In the first decision block in this sub-routine, $u_{THIN}$ is compared to 0. As illustrated in FIG. 14l, if $u_{THIN}$ equals 0, the number of control steps sent to the throttle actuator control is stored and the program returns from the TAC sub-routine to the CLCP sub-routine. If $u_{THIN}$ does not equal 0, the TAC sub-routine reaches the next decision block, $u_{THIN}>0$? If $u_{THIN}$ is greater than 0, as best illustrated in FIG. 14k, the throttle actuator enable line is strobed high. An open throttle/close throttle signal is sent to the throttle actuator control. In the next decision block, the absolute magnitude of $u_{THIN}$ is compared to $u_{THMAX}$, the maximum allowable throttle command. If the absolute magnitude of $u_{THIN}$ is not less than $u_{THMAX}$, then $u_{THIN}$ is set equal to $u_{THMAX}$. If the absolute magnitude of $u_{THIN}$ is less than $u_{THMAX}$, this sub-routine continues as illustrated in FIG. 14l. The control step output to the throttle actuator control circuit is sent. The throttle actuator control enable line is strobed low to initiate throttle motion. The number of control steps sent to the throttle actuator control is stored, and the program returns from the TAC sub-routine to CLCP sub-routine.

Returning to FIG. 14j, if $u_{THIN}$ is not greater than 0, the open throttle/close throttle flag is reset to close (FIG. 14k). Then the absolute magnitude of $u_{THIN}$ is calculated, and the throttle actuator enable line is strobed high. An open throttle/close throttle signal is sent to the throttle actuator control. Then the sub-routine continues with the comparison of the absolute magnitude of $u_{THIN}$ to $u_{THMAX}$ and the remainder of the TAC sub-routine as previously discussed.

LIST OF VARIABLES FOR FIGS. 13, 14a–14l $E_s$—Speed error. Speed set-point minus filtered engine speed.

EMGCNT—Emergency counter. Number of successive cylinders in the firing order with an IP algebraically less than RUFEMG.

EMGFLG—Emergency flag. Flag is set to $FFFF_{16}$ if emergency throttle action is initiated in IPSUB. If flag is set, closed-loop subroutine (CLCP) will not initiate any throttle action. Flag is reset to $0000_{16}$ at end of CLCP.

EMGLIM—Emergency count limit. Number of successive "bad" cylinder firings needed to initiate emergency throttle action.

EMGSUM—Cumulative emergency counter. Number of emergency actions that have been initiated during the past roughness loop update interval.

EMGTH—Emergency throttle movement. Number of stepper motor control steps that the throttle actuator is commanded to open in an emergency.

IP—Index of performance. Individual IP for one firing of one cylinder.

OPCYC—Speed loop update interval. The speed loop is updated once every OPCYC engine cycles.

RUFCNT—Roughness loop counter limit. Roughness loop is updated once for every RUFCNT*OPCYC engine cycles.

RUFEMG—Emergency roughness level. Large negative value. An individual cylinder IP less than RUFEMG causes the emergency counter to be incremented.

RUFMAX—Roughness set-point.

$S_d$—Idle speed set-point.

$S_{dll}$—Idle speed set-point lower limit. Lowest admissible speed set-point.

$S_{dul}$—Idle speed set-point upper limit. Highest admissible speed set-point.

$S_m$—Filtered mean engine speed.

SUMLIM—Limit of cumulative emergency count. If more than SUMLIM emergency actions are initiated during one roughness loop update interval (RUFCNT*OPCYC engine cycles) the roughness set-point is reduced.

UTHIN—Control output to throttle actuator. Number of stepper motor control steps that the throttle actuator control is commanded to move.

UTHMAX—Maximum allowable throttle command. Maximum number of control steps that the throttle actuator can be commanded to move in one direction.

What is claimed is:

1. A system for controlling the performances of the individual cylinders of a multiple cylinder internal combustion engine comprising an engine ignition generator and spark distribution system, means for coupling the ignition generator and spark distribution system to the various cylinders, means for sensing engine crankshaft position, a clock for generating a time base, means for sensing the top dead center point of the power stroke in each cylinder, means for calculating crankshaft speed, means for coupling the clock and the crankshaft position sensor to the crankshaft speed calculator, means for calculating combustion efficiencies of the various cylinders, means for coupling the combustion efficiency calculating means to the clock, to the crankshaft position sensor, and to the means for sensing the top dead center point, the combustion efficiency calculating means calculating the combustion efficiency of each cylinder by determining a measure of the speed of the crankshaft during a portion of each cylinder's stroke in response to signals from the clock and the crankshaft position sensor and comparing the measures of crankshaft speed determined during the strokes of cylinders, means for calculating ignition timing for the various cylinders to control the performances of the various cylinders, means for coupling the combustion efficiency calculator to the ignition timing calculator and means for coupling the ignition timing calculator to the ignition generator and spark distribution system.

2. The system of claim 1 wherein the combustion efficiency calculator comprises a data processor for utilizing the signals from the time base generator, the crankshaft position sensor and the means for sensing the top dead center point to provide a set of data points about the top dead center point.

3. A system for controlling the performances of the individual cylinders of a multiple cylinder internal combustion engine comprising an engine fuel distribution system, means for coupling the fuel distribution system to the various cylinders, means for sensing engine crankshaft position, a clock for generating a time base, means for sensing the top dead center point of the power stroke in each cylinder, means for calculating crankshaft speed, means for coupling the clock and the crankshaft position sensor to the crankshaft speed calculator, means for calculating combustion efficiencies of the various cylinders, means for coupling the combustion efficiency calculating means to the means for sensing the top dead center point, to the means for sensing the crankshaft position and to the clock, means for calculating a fuel distribution parameter for the various cylinders to control the performance of the various cylinders, means for coupling the combustion efficiency calculator means to the means for calculating the fuel distribution parameter and means for coupling the fuel distribution parameter calculation means to the engine fuel distribution system.

4. The system of claim 3 wherein the combustion efficiency calculator comprises a data processor for utilizing the signals from the time base generator, the crankshaft position sensor and the means for sensing the top dead center point to provide a set of data points about the top dead center point.

5. The system of claim 3 wherein the fuel distribution parameter is the amount of fuel which is to be metered into each respective cylinder.

6. The system of claim 3 wherein the fuel distribution parameter is the time in the respective cylinder's operating cycle at which the fuel is metered into the cylinder.

7. An adaptive idle speed control system for an internal combustion engine, comprising an engine fuel distribution system, means for coupling the engine fuel distribution system to the engine's cylinders including a throttle for controlling the flow of fuel through the fuel distribution system for controlling the speed of the engine, means for sensing engine crankshaft position, a clock for generating a time base, means for calculating crankshaft speed, means for coupling the clock and the crankshaft position sensor to the crankshaft speed calculator, means for calculating an index of performance for each of the various cylinders, means for coupling the performance index calculating means to the clock and to the crankshaft position sensor, the performance index calculating means calculating the index of performance of each cylinder by determining crankshaft speed during a portion of each cylinder's stroke in response to signals from the clock and the crankshaft position sensor and comparing the crankshaft speeds determined during the strokes of cylinders, means for calculating engine roughness based upon the indices of performance, means for coupling the roughness calculating means to the performance index calculating means, means for comparing the roughness to a roughness set point and adjusting the throttle in response to the comparison to control the idle speed of the engine, means for coupling the comparing and adjusting means to the throttle, means for determining the roughness set point in response to the indices of performance, and means for coupling the roughness set point determining means to the performance index calculating means.

8. The system of claim 7 wherein the roughness set point determining means changes the roughness set point in response to a predetermined number of indices of performance for successive cylinders exceeding a predetermined limit.

9. The system of claim 8 wherein the limit comprises an indication of excessive degradation of the index of performance from one cylinder to the next.

10. The system of claim 8 wherein changing the roughness set point causes the comparing and adjusting means to increase the engine idle speed.

* * * * *

UNITED STATES PATENT AND TRADEMARK OFFICE
CERTIFICATE OF CORRECTION

PATENT NO. : 4,532,592

DATED : July 30, 1985

INVENTOR(S) : Stephen J. Citron and William P. Mihelc

It is certified that error appears in the above-identified patent and that said Letters Patent is hereby corrected as shown below:

At Column 4, line 38, delete "accéleration" and insert therefor --acceleration--;

At Column 5, line 45, delete "(RPM" and insert therefor --(RPM)--; and

At Column 10, line 55, delete "90-93" and insert therefor --$q_0$-$q_3$--.

Signed and Sealed this

Twelfth Day of November 1985

[SEAL]

Attest:

DONALD J. QUIGG

Attesting Officer

Commissioner of Patents and Trademarks